(12) United States Patent
Aoki et al.

(10) Patent No.: US 9,372,261 B2
(45) Date of Patent: Jun. 21, 2016

(54) RADAR DEVICE AND METHOD OF PROCESSING SIGNAL

(71) Applicant: FUJITSU TEN LIMITED, Kobe-shi (JP)

(72) Inventors: Masatoshi Aoki, Kobe (JP); Hisateru Asanuma, Kobe (JP); Yasuhiro Kurono, Kobe (JP)

(73) Assignee: FUJITSU TEN LIMITED, Kobe-shi (JP)

(*) Notice: Subject to any disclaimer, the term of this patent is extended or adjusted under 35 U.S.C. 154(b) by 460 days.

(21) Appl. No.: 13/847,620

(22) Filed: Mar. 20, 2013

(65) Prior Publication Data
US 2013/0307718 A1 Nov. 21, 2013

(30) Foreign Application Priority Data
Mar. 21, 2012 (JP) .................. 2012-063260

(51) Int. Cl.
*G01S 13/93* (2006.01)
*G01S 13/50* (2006.01)
(Continued)

(52) U.S. Cl.
CPC ............... *G01S 13/50* (2013.01); *G01S 7/354* (2013.01); *G01S 13/345* (2013.01); *G01S 13/584* (2013.01); *G01S 13/931* (2013.01); *G01S 7/4004* (2013.01);
(Continued)

(58) Field of Classification Search
CPC ....... G01S 13/931; G01S 7/411; G01S 7/414; G01S 13/50; G01S 7/354
USPC ........................................... 342/70, 159, 162
See application file for complete search history.

(56) References Cited

U.S. PATENT DOCUMENTS

| | | | | | |
|---|---|---|---|---|---|
| 4,811,020 | A | * | 3/1989 | Montheil | ............... G01S 7/025 342/149 |
| 6,127,965 | A | * | 10/2000 | McDade | ............... G01S 13/931 342/104 |

(Continued)

FOREIGN PATENT DOCUMENTS

| | | |
|---|---|---|
| CN | 1259675 A | 7/2000 |
| JP | A-62-015480 | 1/1987 |

(Continued)

OTHER PUBLICATIONS

Office Action issued in Chinese Application No. 201310089485.1 dated Sep. 26, 2014 (with translation).

(Continued)

*Primary Examiner* — John B Sotomayor
*Assistant Examiner* — Marcus Windrich
(74) *Attorney, Agent, or Firm* — Oliff PLC

(57) ABSTRACT

A radar device according to an embodiment includes a transmission unit, a reception unit, and a processing unit. The transmission unit emits a transmission wave relating to a frequency-modulated transmission signal. The reception unit receives a reflected wave acquired by reflecting the transmission wave on an object as a reception signal. The processing unit detects object data corresponding to the object from the reception signal, outputs the object data to the vehicle control device that controls the vehicle, and removes object data satisfying the removal condition that is a condition used for determining whether or not object data is to be removed from an output target for the vehicle control device and includes at least the distance and the relative speed of the object data with respect to the speed of the vehicle as conditions from output targets for the vehicle control device.

19 Claims, 14 Drawing Sheets

(51) Int. Cl.
*G01S 7/35* (2006.01)
*G01S 13/34* (2006.01)
*G01S 13/58* (2006.01)
*G01S 13/48* (2006.01)
*G01S 7/40* (2006.01)

(52) U.S. Cl.
CPC ........... *G01S 13/48* (2013.01); *G01S 2013/935* (2013.01); *G01S 2013/9321* (2013.01); *G01S 2013/9325* (2013.01); *G01S 2013/9346* (2013.01); *G01S 2013/9375* (2013.01); *G01S 2013/9378* (2013.01); *G01S 2013/9385* (2013.01)

(56) References Cited

U.S. PATENT DOCUMENTS

| | | | |
|---|---|---|---|
| 6,300,896 | B1 | 10/2001 | Kull et al. |
| 7,158,218 | B2* | 1/2007 | Arita .................. G01S 17/936 342/70 |
| 2006/0049978 | A1* | 3/2006 | Siegel ................ G01S 13/534 342/159 |
| 2007/0109176 | A1* | 5/2007 | Nakanishi ........... G01S 13/584 342/70 |
| 2008/0042894 | A1* | 2/2008 | Kikuchi .............. B60W 10/184 342/71 |
| 2009/0243912 | A1* | 10/2009 | Lohmeier ............ G01S 7/4004 342/70 |
| 2010/0033365 | A1* | 2/2010 | Kishida ................ G01S 13/42 342/70 |
| 2010/0321231 | A1* | 12/2010 | Nakahama ............ G01S 7/062 342/118 |
| 2011/0304498 | A1* | 12/2011 | Yanagihara ........... G01S 7/412 342/70 |

FOREIGN PATENT DOCUMENTS

| | | |
|---|---|---|
| JP | H08-249599 A | 9/1996 |
| JP | 2000-177515 A | 6/2000 |
| JP | 2005-127781 A | 5/2005 |
| JP | 2009-229374 A | 10/2009 |
| JP | 2010-038706 A | 2/2010 |
| JP | 2010-091317 A | 4/2010 |
| JP | 2011-215002 A | 10/2011 |

OTHER PUBLICATIONS

Jun. 1, 2015 Chinese Office Action issued in Chinese Patent Application No. 201310089485.1.

Dec. 15, 2015 Office Action issued in Japanese Patent Application No. 2012-063260.

* cited by examiner

RADAR DEVICE AND METHOD OF PROCESSING SIGNAL

CROSS-REFERENCE TO RELATED APPLICATION

This application is based upon and claims the benefit of priority of the prior Japanese Patent Application No. 2012-063260, filed on Mar. 21, 2012, the entire contents of which are incorporated herein by reference.

BACKGROUND OF THE INVENTION

1. Field of the Invention

A disclosed embodiment relates to a radar device and a method of processing a signal.

2. Description of the Related Art

Recently, in a radar device detecting objects, the detection accuracy of data (hereinafter, referred to as "object data") corresponding to an object within a scanning range has been improved in accordance with the improvement of the output of a transmission wave, which is accompanied with the improvement of the performance of an RF (Radio Frequency) circuit generating a transmission signal of the radar device, the improvement of the signal processing capability of a signal processing unit for a reception signal that is based on a reflected wave acquired by reflecting a transmission wave on an object, and the like. For example, in a case where such a radar device is mounted in a vehicle, object data detected by the signal processing unit of the radar device is output to a vehicle control device that is electrically connected to the radar device. Then, the vehicle control device controls the behavior of the vehicle based on information of a relative distance, a relative speed, an angle, and the like of the object with respect to the vehicle.

Here, an overview of the process of detecting object data is as follows. A transmission signal corresponding to a transmission wave of a radar device and a reception signal corresponding to a reception wave are mixed by a mixer, and an FFT (Fast Fourier Transform) process is performed for a bit signal that is a signal of a difference between the transmission signal and the reception signal, whereby a plurality of transformed signals are generated. Then, signals exceeding a predetermined threshold are derived as peak signals from among the plurality of transformed signals, and object data is detected by pairing the peak signals of an UP zone and a DOWN zone.

For example, in a case where a microscopic object having a relative small reflection area for a transmission wave such as snow or rain is present on the front side of the vehicle within the scanning range of the radar device, the following process is performed in a conventional radar device. In other words, while the signal level of a transformed signal becomes higher as a distance between the vehicle and the microscopic object decreases, the signal level of the transformed signal does not exceed a predetermined threshold and thus is not derived as a peak signal. As a result, object data corresponding to a microscopic object such as snow or rain is not detected. As a material describing the technology relating to the present application, there is Japanese Patent Application Laid-Open No. 62-15480.

However, there is a case where a microscopic object that is not detected as object data by the conventional radar device is detected as object data in accordance with the improvement of the detection accuracy of an object described above. In other words, as the signal level of a transformed signal corresponding to a microscopic object such as snow or rain that is present at an extremely short distance (for example, a distance of 0.6 m on the front side of the vehicle) from the vehicle exceeds a predetermined threshold in accordance with the improvement of the performance of the radar device, there is a case where the signal processing unit derives the transformed signal corresponding to the microscopic object as a peak signal and detects object data corresponding to the microscopic object. Then, as the object data of the microscopic object is output to the vehicle control device, the radar device outputs object data that is not originally needed to be output to the vehicle control device, and there is a case where the vehicle control device performs unnecessary control for the vehicle.

For example, in a case where the vehicle travels on the front side, a microscopic object such as snow or rain is a stationary object having a speed of about 0 km with respect to the front side of the vehicle and has a relative speed corresponding to the speed of the vehicle. For example, in a case where the vehicle travels at 60 km/h, the microscopic object is at 60 km/h with respect to the vehicle when viewed from the vehicle, and, when the forward direction (traveling direction) of the vehicle is set for a positive relative speed, the relative speed is −60 km/h. In a case where the object is present at an extremely short distance (for example, a distance of 0.6 m on the front side of the vehicle) from the vehicle, bit frequencies generated to be frequencies on both positive and negative sides as frequencies of differences between the transmission signal and the reception signal in the UP zone and the DOWN zone have the following correspondence relation with the microscopic object. In other words, a bit frequency of a frequency present on the negative side corresponds to a microscopic object in the UP zone, and a bit frequency of a frequency present on the positive side corresponds to a microscopic object in the DOWN zone. In other words, the bit frequency on the positive side of the UP zone and the bit frequency on the negative side of the DOWN zone are not bit frequencies that correspond to a microscopic object.

Before an FFT process in which a signal of a bit frequency (hereinafter, also referred to as a "bit signal") is transformed into a transformed signal is performed, bit signals are filtered by a BPF (Band-pass filter). As a result, the bit frequencies on the negative side are filtered, and bit signals of positive-side frequencies in the UP zone and the DOWN zone are targets for the FFT process. Then, a peak signal of the positive-side frequency in the UP zone and a peak signal of the positive-side frequency in the DOWN zone are paired. In other words, originally, the peak signal of the negative side in the UP zone, which corresponds to a microscopic object, is filtered and is not paired with a peak signal of the positive side in the DOWN zone. As a result, false object data (hereinafter, referred to as "ghost data") having a distance and a relative speed different from the original distance and relative speed of the microscopic object is derived.

More specifically, for example, when the vehicle travels at 60 km, in a case where a microscopic object is present at an extremely short distance (for example, 0.6 m on the front side of the vehicle) from the vehicle, and the microscopic object is a microscopic object such as snow or rain having a relative speed of −60 km/h corresponding to the speed of the vehicle, in the radar device, ghost data that is present at a short distance (for example, 6.64 m on the front side of the vehicle) from the vehicle and has a relative speed (for example, of −5.94 km/h (−1.65 m/s)) is detected.

As a result, there is a case where the radar device outputs ghost data that does not originally need to be output to the vehicle control device, and the vehicle control device controls the behavior of the vehicle based on the ghost data.

SUMMARY OF THE INVENTION

A radar device according to an embodiment includes a transmission unit, a reception unit, and a processing unit. The transmission unit emits a transmission wave relating to a frequency-modulated transmission signal. The reception unit receives a reflected wave acquired by reflecting the transmission wave on an object as a reception signal. The processing unit detects object data corresponding to the object from the reception signal, outputs the object data to the vehicle control device that controls the vehicle, and removes object data satisfying the removal condition that is a condition used for determining whether or not object data is to be removed from an output target for the vehicle control device and includes at least the distance and the relative speed of the object data with respect to the speed of the vehicle as conditions from output targets for the vehicle control device.

BRIEF DESCRIPTION OF THE DRAWINGS

Complete understanding of the present invention and advantages thereof will be easily acquired by reading detailed description of the invention presented as below with reference to the accompanying drawings.

DETAILED DESCRIPTION OF THE PREFERRED EMBODIMENT

Hereinafter, embodiments of the present invention will be described with reference to the drawings. The embodiments presented below are examples, and the technical scope of the invention of the present application is not limited thereto.

1. Block Diagram

Figure 1:
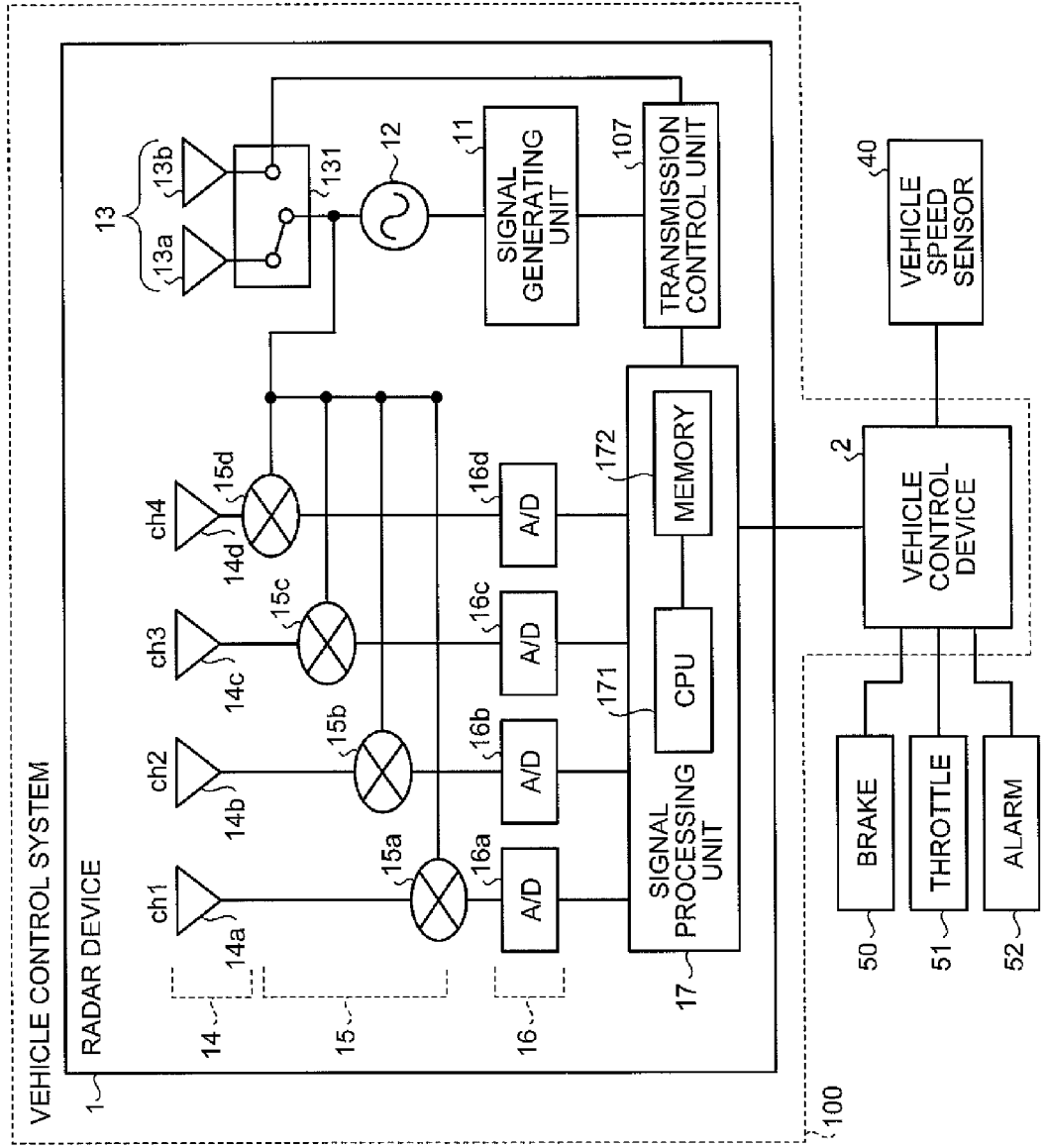
FIG. 1 is a block diagram of a vehicle control system according to an embodiment.

FIG. 1 is a block diagram of a vehicle control system 100 according to an embodiment. The vehicle control system 100 mainly includes a radar device 1 and a vehicle control device 2. For example, the radar device 1 is disposed in a front portion of the front side of a vehicle, scans a predetermined scanning range by one scan, derives a relative distance between a vehicle (hereinafter, simply referred to as a "vehicle") including the radar device 1 and an object and a relative speed thereof, and derives a horizontal position (a distance between the vehicle and the object in the vehicle width direction) that corresponds to the angle of the object viewed from the vehicle. In addition, the mounting position of the radar device 1 is not limited to the front portion of the front side of the vehicle, but may be any one of the rear side or the lateral side of the vehicle.

The vehicle control device 2 is a device disposed inside the vehicle and is an ECU (Electronic Control Unit) that controls each device of the vehicle.

The radar device 1 detects object data corresponding to an object such as another vehicle that is present on the periphery of the vehicle in which the radar device 1 is mounted. Described in more detail, the radar device emits a transmission wave relating to a frequency-modulated transmission signal, receives a reflected wave acquired by reflecting the transmission wave on an object as a reception signal, and detects object data corresponding to the object from the reception signal. Then, the vehicle control device 2 outputs control signals used for the operation of a brake 50, the adjustment of the degree of openness of a throttle 51, and alarming a warning sound to a user using the vehicle using an alarm 52, which will be described later, to each unit of the vehicle based on the object data.

In addition, the following information is transmitted from each sensor to the radar device 1. In other words, a traveling speed of the vehicle (hereinafter, simply referred to as a "vehicle speed") supplied from a vehicle speed sensor 40 to be described later is output to a signal processing unit 17 of the radar device 1 through the vehicle control device 2. Then, the signal processing unit 17 performs a removing process in which object data satisfying a removal condition to be described later is removed from an output target for the vehicle control device 2 based on the information of the vehicle speed.

The radar device 1 mainly includes a signal generating unit 11, an oscillator 12, a transmission antenna 13, a reception antenna 14, a mixer 15, an AD (Analog to Digital) converter 16, and a signal processing unit 17.

The signal generating unit 11 generates a modulation signal of which the voltage changes, for example, in the shape of chopping waves based on an instruction signal transmitted from a transmission control unit 107 to be described below.

The oscillator 12 is a voltage controlled oscillator that controls the oscillation frequency by using a voltage, performs frequency modulation of a signal (for example, a signal of a frequency band having 76.5 GHz as the center frequency) of a predetermined frequency band based on a modulation signal generated by the signal generating unit 11, and outputs a resultant signal to the transmission antenna 13 as a transmission signal.

The transmission antenna 13 outputs a transmission wave corresponding to the transmission signal to the outside of the vehicle. The radar device 1 according to this embodiment includes two transmission antennas including transmission antennas 13a and 13b. Switching between the transmission antennas 13a and 13b is performed in accordance with the switching of a switching unit 131 at a predetermined period, and a transmission wave is continuously output to the outside of the vehicle from the transmission antenna 13 that is connected to the oscillator 12.

The switching unit 131 is a switch that switches between connections of the oscillator 12 and the transmission antennas 13 and connects one of the transmission antennas 13a and 13b to the oscillator 12 in accordance with a signal transmitted from the transmission control unit 107.

The reception antenna 14 is formed by a plurality of antennas receiving reflected waves acquired by reflecting the transmission wave that is continuously transmitted from the transmission antennas 13 on objects. In this embodiment, the reception antenna 14 is configured by four reception antennas including reception antennas 14a (ch1), 14b (ch2), 14c (ch3), and 14d (ch4). The reception antennas 14a and 14d are arranged so as to be equally spaced.

The mixer 15 is arranged in each reception antenna. The mixer 15 mixes the reception signal and the transmission signal. Then, a bit signal of a difference between the transmission signal and the reception signal is generated by mixing the reception signal and the transmission signal and is output to the AD converter 16.

The AD converter 16 performs sampling of the bit signal, which is an analog signal, at a predetermined period, thereby deriving a plurality of pieces of sampling data. Then, by quantizing the sampled data, the bit signal of analog data is converted into digital data, and the digital data is output to the signal processing unit 17. Similarly to the mixer 15, the AD converter 16 is disposed in each reception antenna.

The signal processing unit 17 is a computer that includes a CPU 171 and a memory 172 and derives a relative distance, a relative speed, and an angle of object data corresponding to an object based on the bit signal output from the AD converter 16.

In addition, the signal processing unit 17 receives information of the vehicle speed from the vehicle control device 2 and performs the process of removing object data satisfying a removal condition to be described later from the output target for the vehicle control device 2 based on the vehicle speed. For example, the signal processing unit 17 removes object data satisfying the removal condition out of object data corresponding to at least one of rain, snow, and the like from the output target for the vehicle control device 2.

Described in more detail, in a case where object data is detected which appears in accordance with a change in the weather such as rain, snow, hail, or the like having no need to be set as a control target of the vehicle control device 2 and includes ghost data corresponding to a microscopic object having a relatively small reflection area on which the transmission wave is reflected, the signal processing unit 17 removes the ghost data having no need to be output to the vehicle control device 2 from the output target for the vehicle control device 2 based on the removal condition.

The CPU 171 performs various calculation processes based on various programs recorded in the memory 172. For example, the CPU 171 performs the process of removing ghost data out of object data output to the vehicle control device 2 and the like.

In the memory 172, execution programs of various calculation processes and the like performed by the CPU are recorded, and, for example, a program used in a case where the process of removing ghost data is performed and the like are recorded.

The vehicle control device 2 controls the operations of various devices of the vehicle. In other words, the vehicle control device 2 acquires information from various sensors such as a vehicle speed sensor 40. Then, the vehicle control device 2 controls the behavior of the vehicle by operating various devices such as a brake 50, a throttle 51, and an alarm 52 based on the information acquired from various sensors and the object data acquired from the signal processing unit 17 of the radar device 1.

An example of vehicle control using the vehicle control device 2 is as follows. In a case where there is collision risk, a warning is displayed by controlling the alarm 52, and the speed of the traveling vehicle is decreased by controlling the brake 50. In addition, at the time of a collision, the vehicle control device 2 performs control for preparing for a shock by fixing a passenger to the seat using a safety belt or reducing a damage occurring to the body of a passenger by fixing the headrest. As an example of such control, there is a PCS (Pre-Crash Safety System).

Another example of vehicle control using the vehicle control device 2 is as follows. At least one of the brake 50 and the throttle 51 is controlled in a case where a vehicle travels for tracking a vehicle (hereinafter, referred to as a "front vehicle") that travels on the front side of the vehicle, whereby the vehicle travels for the tracking in a state in which a predetermined inter-vehicle distance is secured between the vehicle and the front vehicle. As an example of such control, there is ACC (Adaptive Cruise Control).

The vehicle speed sensor 40 outputs a signal according to the speed of the vehicle based on the number of revolutions of the vehicle shaft of the vehicle. The vehicle control device 2 acquires a vehicle speed at the current time point based on the signal supplied from the vehicle speed sensor 40. In addition, information of the vehicle speed acquired by the vehicle speed sensor 40 is output to the signal processing unit 17 of the radar device 1 through the vehicle control device 2. Then, the signal processing unit 17 performs the ghost data removing process using the information of the vehicle speed at the timing of detecting object data.

The brake 50 reduces the speed of the vehicle in accordance with an operation of a driver of the vehicle. In addition, the brake 50 reduces the speed of the vehicle under the control of the vehicle control device 2. For example, the speed of the vehicle is reduced such that a distance between the vehicle and the front vehicle is maintained at a constant distance.

The throttle 51 increases the speed of the vehicle in accordance with the operation of a driver of the vehicle. In addition, the throttle 51 increases the speed of the vehicle under the control of the vehicle control device 2. For example, the throttle 51 increases the speed of the vehicle such that a distance between the vehicle and the front vehicle is maintained at a predetermined distance.

The alarm 52 operates in accordance with a signal supplied from the vehicle control device 2. For example, in a case where there is a possibility of the occurrence of a collision between the vehicle and the front vehicle, the alarm 52 outputs a warning sound to a driver of the vehicle for the preparation of the collision.

2. Signal Processing of FM-CW

Next, as an example of a signal processing mode for detecting a reflecting point of an object by using the radar device 1, an FM-CW (Frequency Modulated Continuous Wave) model will be described. In this embodiment, although the FM-CW mode will be described, the mode is not limited to the FM-CW mode as long as a mode is employed in which object data is detected by combining a plurality of zones such as an UP zone, in which the frequency of the transmission signal increases, and a DOWN zone, in which the frequency of the transmission signal decreases.

Figure 2:
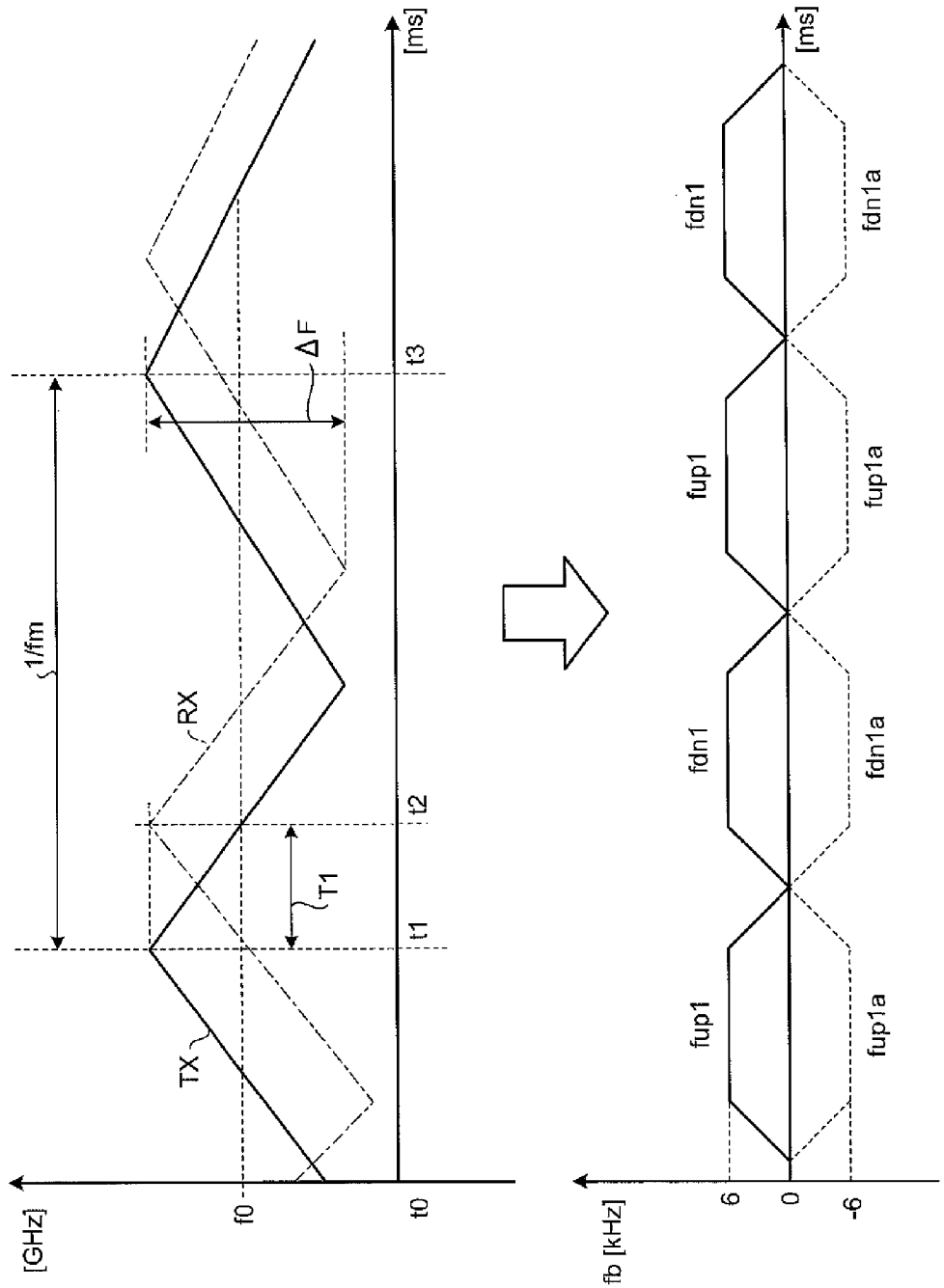
FIG. 2 is a diagram illustrating a transmission signal, a reception signal, and a bit frequency according to an embodiment.
Figure 4:
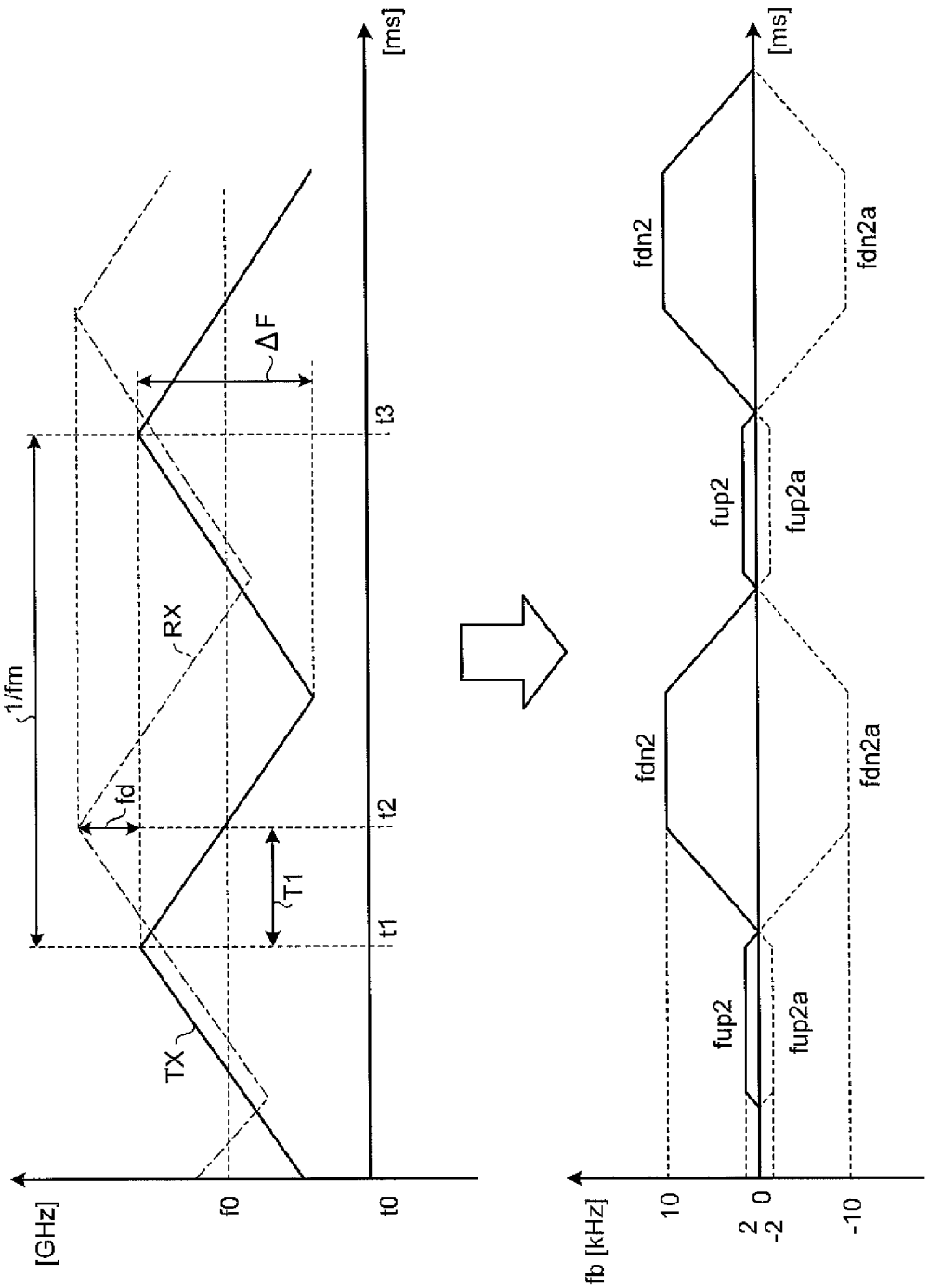
FIG. 4 is a diagram illustrating a transmission signal, a reception signal, and a bit frequency according to an embodiment.
Figure 6:
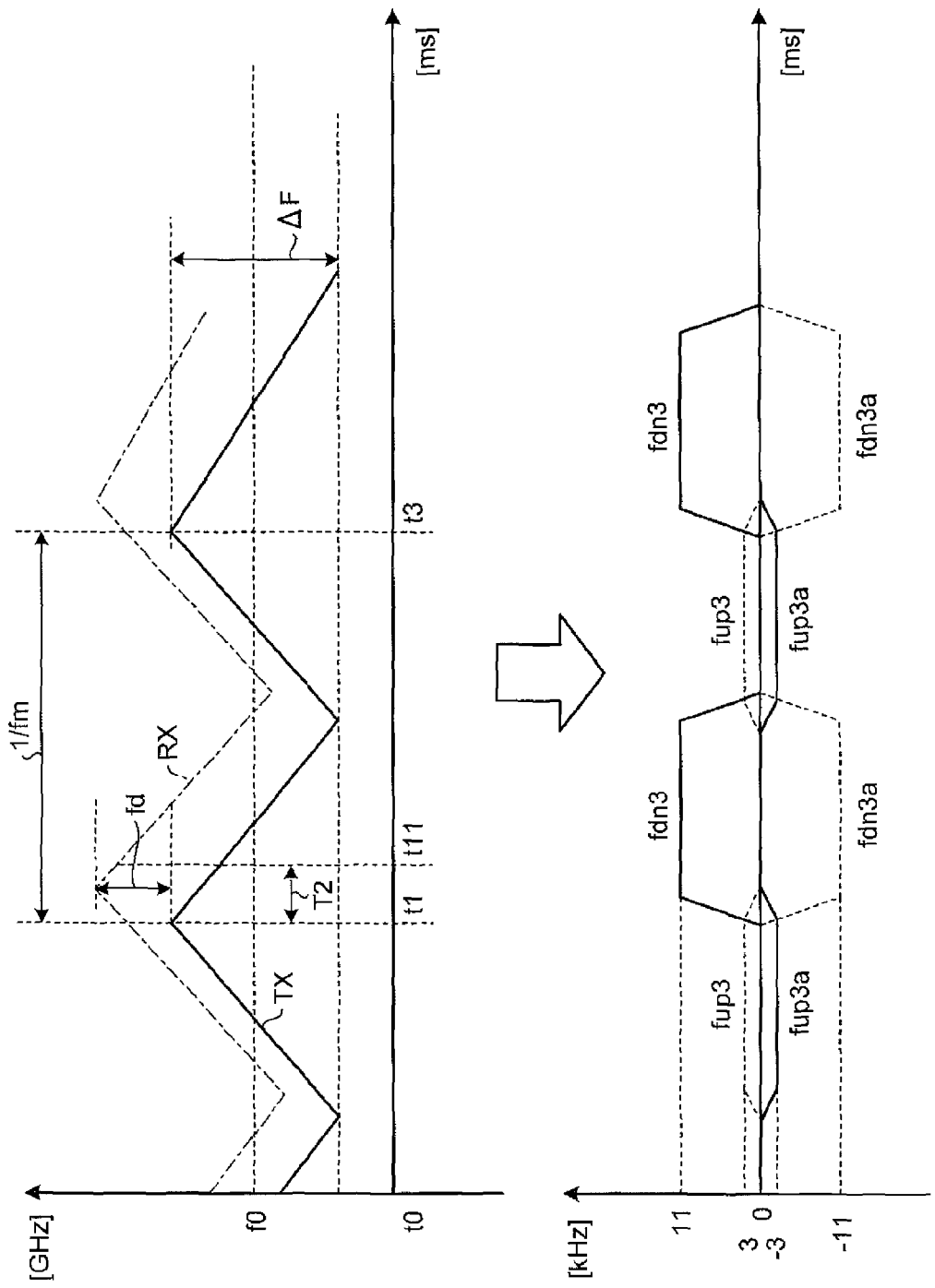
FIG. 6 is a diagram illustrating a transmission signal, a reception signal, and a bit frequency according to an embodiment.

Numerical expressions illustrated below and symbols of FM-CW signals and the bit frequencies illustrated in FIGS. 2, 4, 6 represent the followings.

fb: bit frequency (bit frequencies in the UP zone and the DOWN zone)
   fup: bit frequency of UP zone
   fdn: bit frequency of DOWN zone
   fr: distance frequency
   fd: speed frequency
   fo: center frequency of transmission wave
   $\Delta f$: frequency deviation width
   fm: repetition frequency of modulated wave
   c: speed of light (speed of radio waves)

2-1. Case where Relation Between Vehicle and Object is "First Distance and there is No Speed Difference"

First, signal processing of the up zone and the DOWN zone of the FM-CW in a case where a reflected wave is received from another vehicle traveling at an approximately same speed as the speed of the vehicle on the front side of the vehicle will be described with reference to FIGS. 2 and 3. Described in more detail, a process performed in a case where a distance between the vehicle and an object is a first distance (for example, 10 m), and the vehicle and the object travel at the same speed (in other words, in a case where the relative speed is ±0 km/h) will be described. FIG. 2 is a diagram illustrating a transmission signal TX, a reception signal RX, and a bit frequency fb according to an embodiment.

In an upper diagram of FIG. 2, the horizontal axis represents the time (ms), and the vertical axis represents the frequency (GHz). In the figure, the transmission signal TX denoted by a solid line has a property of changing the frequency at a predetermined period, and there are UP zones in which the frequency increases and DOWN zones in which the frequency decreases up to a predetermined frequency after an increase up to a predetermined frequency. The transmission signal TX repeats a predetermined change such that, after the frequency decreases up to a predetermined frequency, the frequency increases again up to a predetermined frequency. Here, the amplitude of the change is a frequency deviation width $\Delta F$. In addition, the signal period of the transmission signal TX is 1/fm of time t1 to time t3, and the reception signal RX to be described later has the same signal period.

Regarding the reception signal RX, a transmission wave output from the transmission antenna 13 is reflected by an object so as to be a reflected wave, and the reflected wave is received by the reception antenna 14 so as to be a reception signal denoted by a one-dot chain line illustrated in the upper diagram of FIG. 2. In the reception signal, similarly to the transmission signal, there are UP zones and DOWN zones.

As a distance difference between the vehicle and the object increases, the width of a time interval T1 between time t1 and time t2 corresponding to a time delay between the transmission signal TX and the reception signal RX increases. A frequency corresponding to this time interval T1 is a distance frequency fr. In addition, in a case where there is a difference in the speeds of the vehicle and the object, the reception signal RX is shifted with respect to the transmission signal TX in parallel with the frequency direction. The frequency corresponding to this Doppler shift is a speed frequency fd to be described later. In this case, since there is no difference in the speeds of the vehicle and the object, the speed frequency fd=0 kHz.

A lower diagram of FIG. 2 is a diagram illustrating a bit frequency fb according to an embodiment, which illustrates a differential frequency between the transmission signal and the reception signal in the UP zone and a differential frequency between the transmission signal and the reception signal in the DOWN zone with the horizontal axis being set as the time (ms) and the vertical axis being set as the frequency (KHz).

Since the bit frequency is a frequency of a difference between the transmission signal TX and the reception signal RX, the frequencies are generated on both the positive side and the negative side.

In other words, as illustrated in the lower diagram of FIG. 2, a bit frequency of the UP zone on the positive side is a bit frequency of fup1 (for example, 6 kHz), and a bit frequency thereof on the negative side is a bit frequency of fup1a (for example, −6 kHz). In addition, a bit frequency of the DOWN zone on the positive side is a bit frequency of fdn1 (for example, 6 kHz), and a bit frequency thereof on the negative side is a bit frequency of fdn1a (for example, −6 kHz).

Then, out of the positive-side and negative-side bit frequencies of the UP zone and the DOWN zone, a bit frequency corresponding to an object, for example, is determined as follows. In other words, as illustrated in the upper diagram of FIG. 2, in a case where the frequency of the transmission signal TX is higher than the frequency of the reception signal RX in the UP zone, the positives-side bit frequency (for example, the bit frequency fup1 illustrated in the lower diagram of FIG. 2) is the frequency corresponding to an object. On the other hand, in a case where the frequency of the reception signal RX of the UP zone illustrated in the upper diagram of FIG. 2 is higher than the frequency of the transmission signal TX, a signal of the negative-side bit frequency (for example, the bit frequency fup1a illustrated in the lower diagram of FIG. 2) is the signal of the frequency corresponding to an object.

In addition, in the DOWN zone, relation that is reverse to that of the UP zone is formed. In other words, in a case where the frequency of the reception signal RX is higher than the frequency of the transmission signal TX in the DOWN zone illustrated in the upper diagram of FIG. 2, the positives-side bit frequency (for example, the bit frequency fdn1 illustrated in the lower diagram of FIG. 2) is the frequency corresponding to an object. On the other hand, in a case where the frequency of the transmission signal TX is higher than the frequency of the reception signal RX in the DOWN zone illustrated in the upper diagram of FIG. 2, a signal of the negative-side bit frequency (for example, the bit frequency fdn1a illustrated in the lower diagram of FIG. 2) is the signal of the frequency corresponding to an object.

On the premise of the correspondence relation between the bit frequency and an object, filtering is performed for the signals of the positive-side bit frequency and the signals of the negative-side bit frequency in the UP zone and the DOWN zone using a BPF not illustrated in the figure such that the signals of the negative-side bit frequency are not output to the signal processing unit 17 of a later stage. From this, only the signals of the positive-side bit frequency in the UP zone and the DOWN zone are output to the AD converter 16. Then, the signal processing unit 17 performs an FFT process for the signals output from the AD converter 16, thereby deriving transformed signals as illustrated in FIG. 3.

In addition, as illustrated in FIG. 2, since the frequency of the transmission signal TX is higher than the frequency of the reception signal RX in the UP zone, the positive-side bit frequency (the bit frequency fup1) is the frequency that corresponds to an object. On the other hand, in the DOWN zone, since the frequency of the reception signal RX is higher than the frequency of the transmission signal TX, the positive-side bit frequency (the bit frequency fdn1) is the frequency that corresponds to an object. Then, signals of the positive-side bit frequency in the UP zone and the DOWN zone are output to the signal processing unit 17 through the BPF. In other words, signals of the bit frequency corresponding to the object in the UP zone and the DOWN zone are output to the signal processing unit 17.

Figure 3:
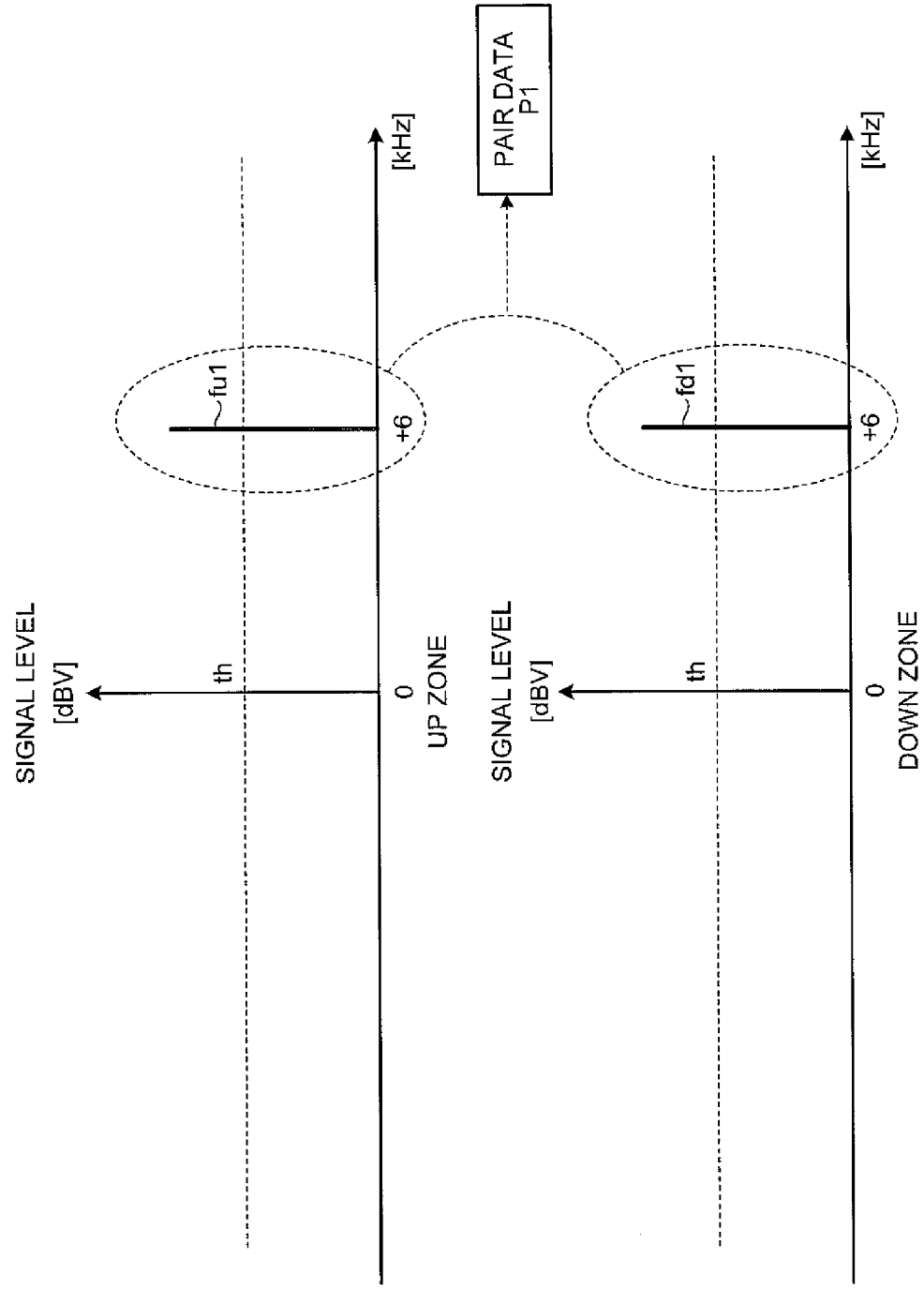
FIG. 3 is a diagram illustrating transformed signals derived by an FFT process according to an embodiment.

FIG. 3 is a diagram illustrating transformed signals derived by an FFT process according to an embodiment. In FIG. 3, the horizontal axis represents the frequency [kHz], and the vertical axis represents the signal level [dBV]. Here, transformed signals fu1 and fd1 illustrated in FIG. 3 are signals that exceed a threshold th representing a predetermined signal level. In addition, the transformed signal fu1 is a signal that corresponds to the bit frequency fup1 illustrated in the lower diagram of FIG. 2, and the transformed signal fd1 is a signal that corresponds to the bit frequency fdn1. Then, as illustrated in FIG. 3, the transformed signals exceeding the threshold th are derived as peak signals fu1 and fd1 by the signal processing unit 17. Then, the peak signal fu1 of the UP zone and the peak signal fd1 of the DOWN zone are paired in accordance with the frequencies, signal levels, and the like of the peak signals fu1 and fd1, whereby pair data P1 is derived. Then, information of a distance, a relative speed, and the like of object data corresponding to an object is detected based on the pair data P1.

2-2. Case where Relation Between Vehicle and Object is "First Distance and Speed Difference"

Next, signal processing of an UP zone and a DOWN zone of the FM-CW in a case where a vehicle receives a reflected wave reflected from another vehicle traveling at a speed different from that of the vehicle on the front side of the vehicle will be described with reference to FIGS. 4 and 5. Described in more detail, for example, in a case where the vehicle travels at 60 km/h, when an object (hereinafter, referred to as a "stationary object") having a speed of 0 km/h in the traveling direction of the vehicle such as a telephone pole or a side wall of the roadway is present on the front side of the vehicle, a relative speed between the vehicle and the stationary object is a relative speed of –60 km/h that corresponds to the speed of the vehicle. Here, description of a portion that is the same as the content described with reference to FIGS. 2 and 3 will not be presented, and different portions will be focused in the description.

FIG. 4 is a diagram illustrating a transmission signal TX, a reception signal RX, and a bit frequency fb according to an embodiment. As illustrated in an upper diagram of FIG. 4, the reception signal RX is shifted with respect to the transmission signal TX in parallel with the frequency direction. In other words, a speed frequency fd according to a Doppler shift is generated. Accordingly, as illustrated in a lower diagram of FIG. 4, the bit frequency fup2 of the UP zone and the bit frequency fdn2 of the DOWN zone have mutually different frequency values. In other words, as illustrated in the lower diagram of FIG. 4, the bit frequency of the UP zone on the positive side is a bit frequency of fup2 (for example, +2 kHz), and the bit frequency on the negative side is a bit frequency of fdn2a (for example, –2 kHz). In addition, the bit frequency of the DOWN zone on the positive side is a bit frequency of fdn2 (for example, +10 kHz), and the bit frequency on the negative side is a bit frequency of fdn2a (for example, –10 kHz).

As described above, signals of the bit frequencies on the positive side are signals of frequencies corresponding to an object in the UP zone and the DOWN zone based on the relation of the frequency between the transmission signal TX and the reception signal RX.

Figure 5:
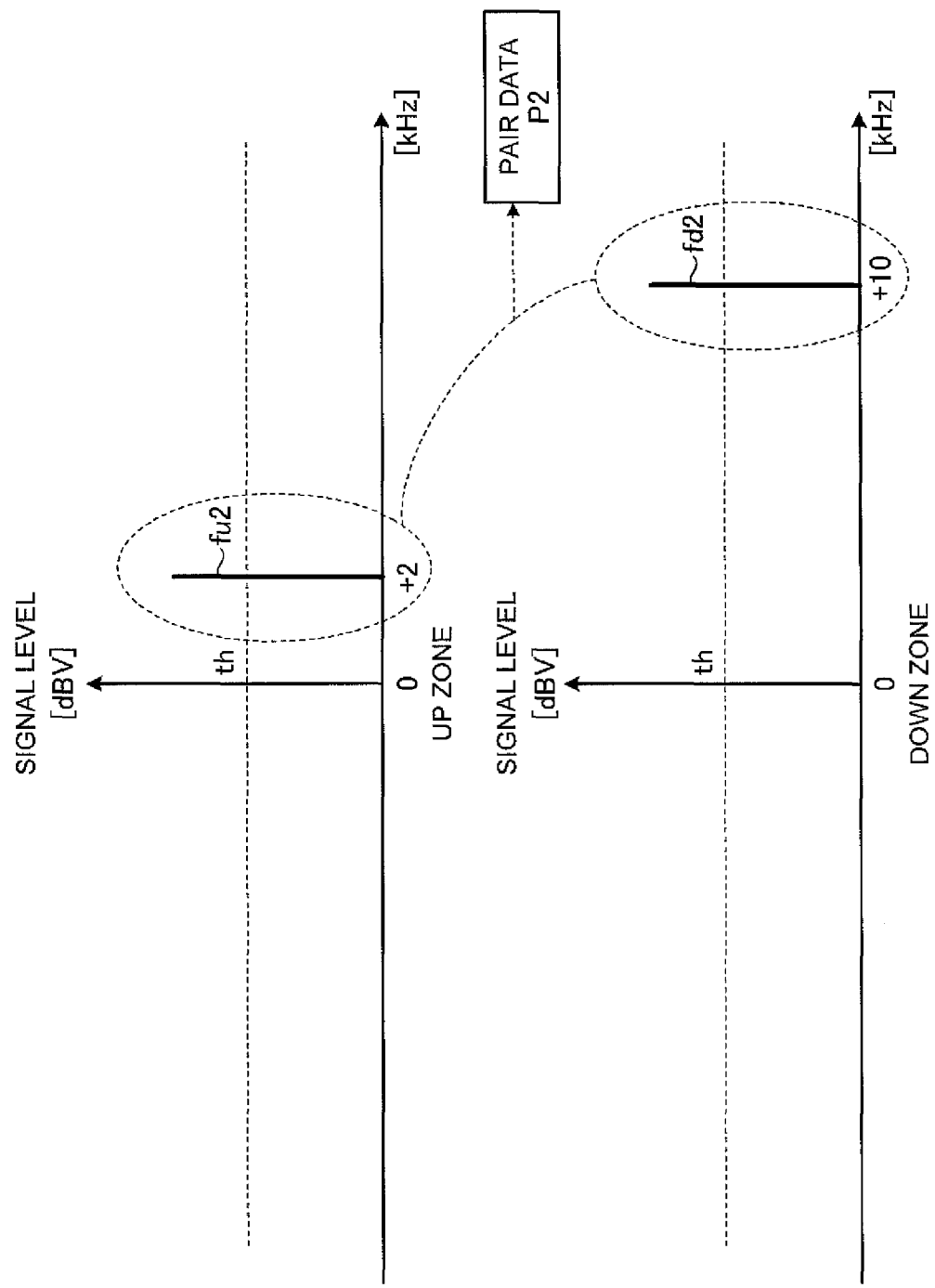
FIG. 5 is a diagram illustrating transformed signals derived by an FFT process according to an embodiment.

FIG. 5 is a diagram illustrating transformed signals derived by an FFT process according to an embodiment. In FIG. 5, the horizontal axis represents the frequency [kHz], and the vertical axis represents the signal level [dBV]. Peak signals fu2 and fd2 illustrated in FIG. 5, differently from the peak signals fu1 and fd1 described with reference to FIG. 3, have mutually different frequency values. Here, the transformed signal fu2 is a signal that corresponds to the bit frequency fup2 illustrated in the lower diagram of FIG. 4, and the transformed signal fd2 is a signal that corresponds to the bit frequency fdn2. Then, the peak signal fu2 of the UP zone and the peak signal fd2 of the DOWN zone are paired, whereby pair data P2 is derived. Then, information of a distance, a relative speed, and the like of object data corresponding to an object is detected based on the pair data P2.

2-3. Case where Relation Between Vehicle and Object is "Second Distance and Speed Difference"

In 2-1 and 2-2 described above, mainly, the process of detecting object data that is object data corresponding to another vehicle traveling on the front side of the vehicle and is needed to be output to the vehicle control device 2 has been described. In contrast to this, hereinafter, signal processing in a case where the radar device receives a reflected wave of a microscopic object such as snow or rain that does not need to be output to the vehicle control device 2 will be described with reference to FIGS. 6 and 7.

In other words, the process of a case where a distance between the vehicle and the object is a second distance (for example, 0.6 m) that is an extremely short distance shorter that the first distance, and the vehicle and the object have mutually different speeds will be described. For example, in a case where the vehicle travels at 60 km/h, when a microscopic object having a speed of 0 km/h is present in the vehicle traveling direction, the relative speed between the vehicle and the microscopic object is a relative speed of –60 km/h that corresponds to the speed of the vehicle. Here, description of a portion that is the same as the content described with reference to FIGS. 2 to 5 will not be presented, and the other portions will be focused in the description.

FIG. 6 is a diagram illustrating a transmission signal TX, a reception signal RX, and a bit frequency fb according to an embodiment. As illustrated in an upper diagram of FIG. 6, a speed frequency fd according to a Doppler shift is generated, and a time interval between time t1 and time t11 that corresponds to a time delay between the transmission signal TX and the reception signal RX is time interval T2 that is shorter than time interval T1. Thus, a distance frequency fr corresponding to this time interval T2 is a frequency lower than the frequency corresponding to time interval T1.

As illustrated in a lower diagram of FIG. 6, the bit frequency of the UP zone on the positive side is a bit frequency of fup3 (for example, +3 kHz), and the bit frequency thereof on the negative side is a bit frequency of fup3a (for example, –3 kHz). In addition, the bit frequency of the DOWN zone on the positive side is a bit frequency of fdn3 (for example, +11 kHz), and the bit frequency thereof on the negative side is a bit frequency of fdn3a (for example, –11 kHz).

Here, in the UP zone illustrated in the upper diagram of FIG. 6, the frequency of the reception signal RX is higher than the frequency of the transmission TX. For this reason, the signal of the bit frequency on the negative side becomes a signal of a frequency that corresponds to a microscopic object. In addition, in the DOWN zone, the frequency of the reception signal RX is higher than the frequency of the transmission signal TX. For this reason, the signal of the bit frequency on the positive side becomes a signal of a frequency that corresponds to the microscopic object.

In the UP zone and the DOWN zone, when filtering is performed for the signal of the bit frequency on the positive side and the signal of the bit frequency on the negative side using a BPF, only the signals of the bit frequencies of the UP zone and the DOWN zone on the positive side are output to the AD converter 16, and thus, in the UP zone, the signal of the bit frequency on the negative side that corresponds to the microscopic object is not output, and the signal of the bit frequency on the positive side that does not correspond to the microscopic object is output from the AD converter 16. Then, in the DOWN zone, the signal of the bit frequency an the positive side that corresponds to the object is output from the AD converter 16. Then, the signal processing unit 17 performs an FFT process for such bit signals, thereby deriving transformed signals as illustrated in FIG. 7.

Figure 7:
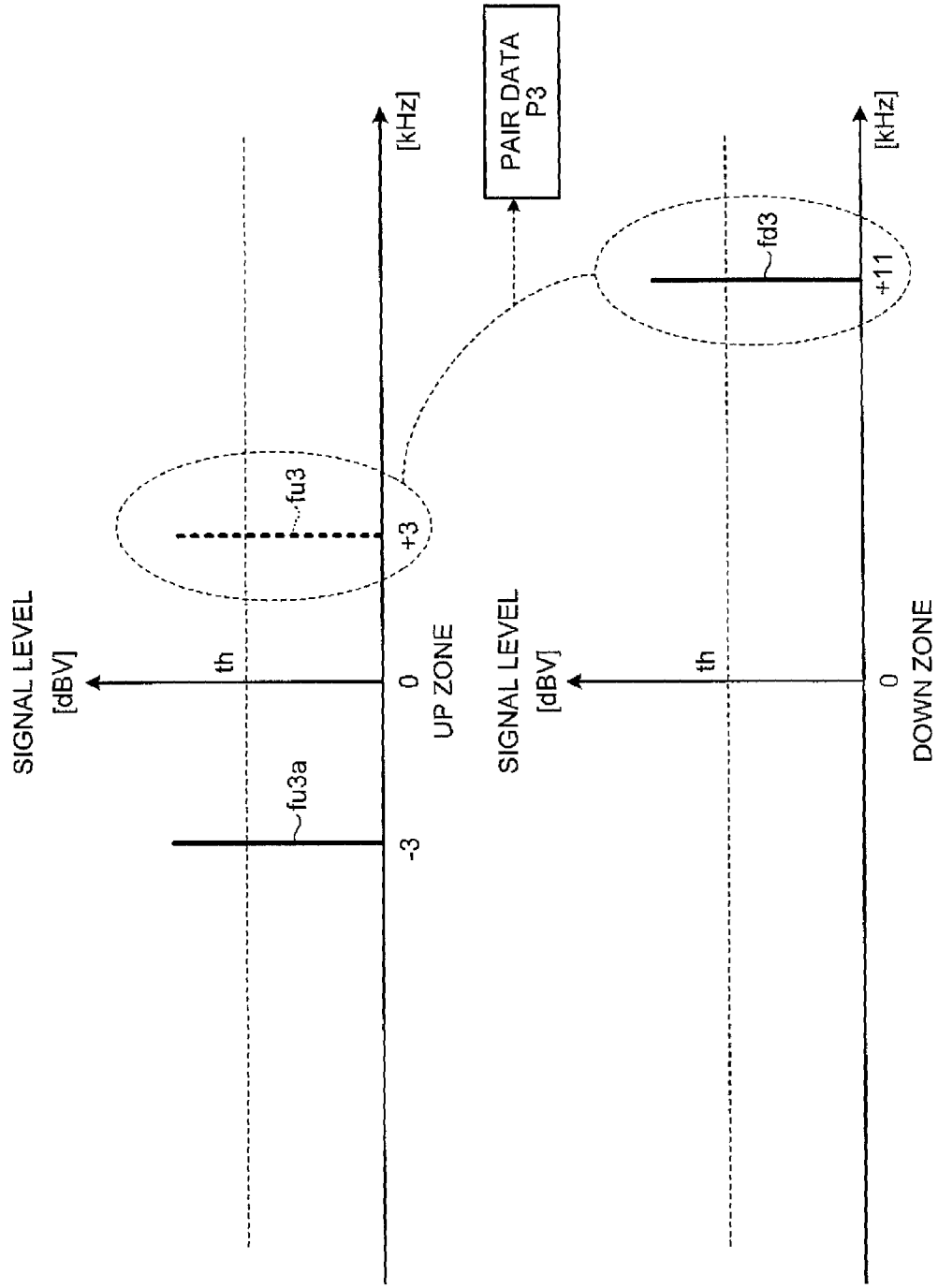
FIG. 7 is a diagram illustrating transformed signals derived by an FFT process according to an embodiment.

FIG. 7 is a diagram illustrating transformed signals derived by an FFT process according to an embodiment. In FIG. 7, the horizontal axis represents the frequency [kHz], and the vertical axis represents the signal level [dBV]. A peak signal fu3 illustrated in FIG. 7 is a peak signal that corresponds to the signal of the bit frequency fup3, and a peak signal fd3 is a peak signal that corresponds to the signal of the bit frequency fdn3. In the paring process, although the peak signal fu3a corresponding to the signal of the bit frequency fup3a that is a peak signal based on the microscopic object is a signal to be originally paired with the peak signal fd3, the peak signal fu3 that does not correspond to the microscopic object and the peak signal fd3 are paired by a filtering process using a BPF. As a result, pair data P3 of ghost data corresponding to a false microscopic object that is different from the pair data of the object data corresponding to the original microscopic object is derived. Thus, information of a distance and a relative speed of the ghost data, which are different from the distance and the relative speed of the original microscopic object, is derived based on the pair data P3.

Here, a distance of the object from the vehicle is derived by using Equation (1), and a relative speed of the object with respect to the vehicle is derived by using Equation (2).

$$R = \frac{(f_{up} + f_{dn}) \cdot c}{2(4\Delta F \times f_m)} \quad (1)$$

$$V = \frac{(f_{up} - f_{dn}) \cdot c}{2(4\Delta F \times f_m)} \quad (2)$$

Like this, in a case where a microscopic object is present in the scanning range of the radar device 1, ghost data having a distance and a relative speed different from the distance and the relative speed of the original control device 2, vehicle control such as the PCS may be performed based on the ghost data. Hereinafter, in a case where the ghost data is detected, a process of removing the ghost data from targets to be output to the vehicle control device 2 will be mainly described in detail.

3. Process Flowchart 3-1. Object Data Output Process

Figure 8:
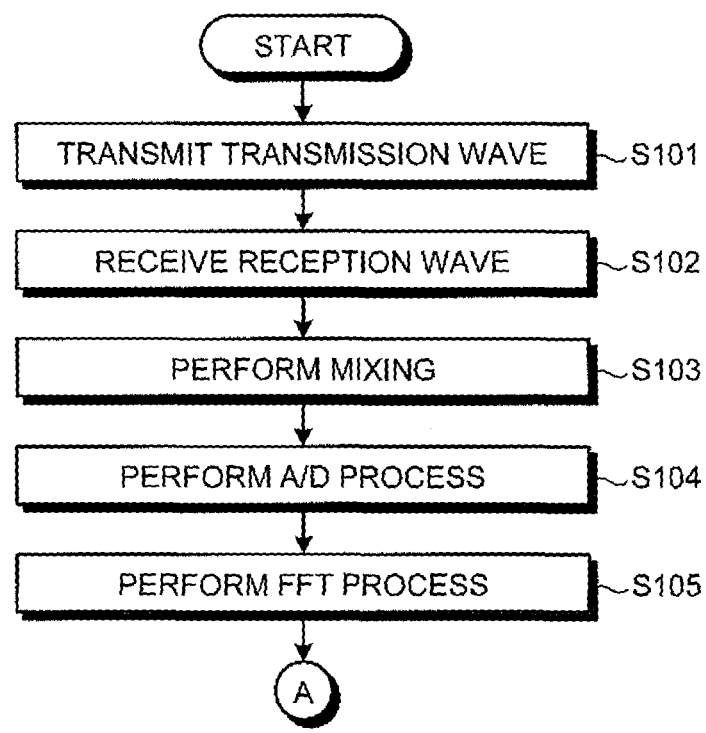
FIGS. 8 to 10 are flowcharts illustrating the process of outputting object data according to an embodiment.
Figure 10:
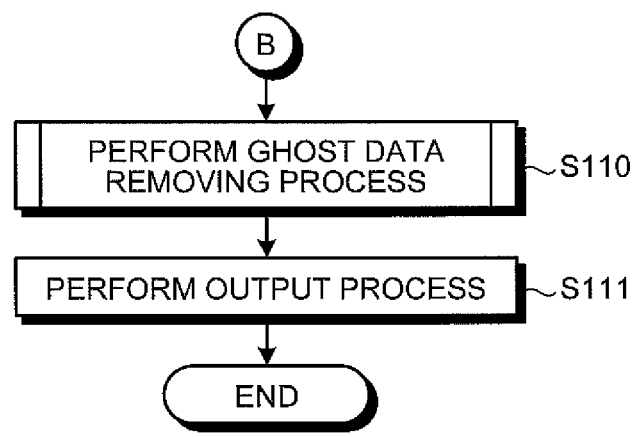

FIGS. 8 and 10 are flowcharts illustrating an object data output process of the radar device 1 according to an embodiment. In Step S101 illustrated in FIG. 8, the transmission antenna 13 outputs a transmission wave corresponding to the transmission signal output from the oscillator 12 to the outside of the vehicle, and the process proceeds to the process of Step S102.

In addition, regarding the transmission wave supplied from the transmission antenna 13, in a case where one UP zone and one DOWN zone are set as one period in the transmission signal TX, the transmission wave corresponding to the first period is output from one transmission antenna 13a to the outside of the vehicle, and the transmission wave corresponding to the second period is output from the transmission antenna 13b that is the other transmission antenna to the outside of the vehicle.

In Step S102, a reflected wave acquired by reflecting the transmission wave on an object is received by the reception antenna 14, and the process proceeds to the process of Step S103.

In Step S103, a reception signal RX and a transmission signal TX corresponding to the reflecting wave received by the reception antenna 14 are mixed by the mixer 15, a bit signal that is a difference between the transmission signal TX and the reception signal RX is generated, and the process proceeds to the process of Step S104.

In Step S104, the AD converter 16 performs AD conversion of the bit signal that is an analog signal for conversion into digital data, and the process proceeds to the process of Step S105.

In Step S105, the signal processing unit 17 performs an FFT process for the bit signal that is digital data so as to generate a transformed signal, and the process proceeds to the process of Step S106.

Figure 9:
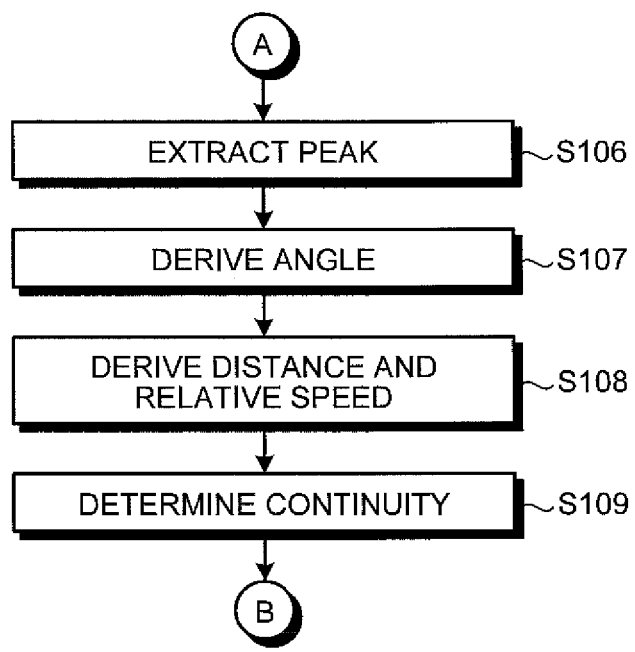

In Step S106 illustrated in FIG. 9, peak signals exceeding a predetermined threshold th are extracted by the signal processing unit 17 from among the FFT-processed transformed signals, and the process proceeds to the process of Step S107.

In Step S107, the signal processing unit 17 performs an angle calculating process based on the peak signals in each one of the UP zone and the DOWN zone, and the process proceeds to the process of Step S108. Described in more detail, the signal processing unit 17 derives the angle of an object using an algorithm of a predetermined angle deriving process. For example, the algorithm of the angle deriving process is ESPRIT (Estimation of Signal Parameters via Rotational Invariance Techniques), an eigenvalue, an eigenvector, and the like of a correlation matrix are calculated based on the information of phase differences of reception signals received by the reception antennas 14a to 14d, and an angle of the object is derived.

In Step S108, the signal processing unit 17 pairs peak signals in the UP zone and the DOWN zone and derives a distance and a relative speed between the vehicle and the object based on Equations (1) and (2) described above, and the process proceeds to the process of Step S109.

In Step S109, the signal processing unit 17 determines whether or not there is time continuity between pair data paired in this scan and the object data detected in the previous scan, and the process proceeds to the process of Step S110. In this continuity determination, data having time continuity is determined as data (hereinafter, referred to as "past correspondence data") corresponding to the object data detected in the past scan, and object data having no time continuity is determined as object data (hereinafter, referred to as "new data") that is newly detected in this scan.

In Step S110 illustrated in FIG. 10, the process of removing ghost data satisfying a removal condition that is a condition for removing data from the output target for the vehicle control device 2 out of a plurality of pieces of object data for which the continuity determination has been performed from the output target for the vehicle control device 2 is performed, and the process proceeds to the process of Step S111.

In Step S111, the signal processing unit 17 outputs object data, which has a high priority level, to be output to the vehicle control device 2 out of remaining object data after the removal of ghost data in the process of Step S110 to the vehicle control device 2, and the process ends. Here, the object data having a high priority level, for example, is object data having a relative speed higher than those of the other pieces of object data, object data having a distance shorter than those of the other pieces of object data, or the like.

3-2. Ghost Data Removing Process

Figure 11:
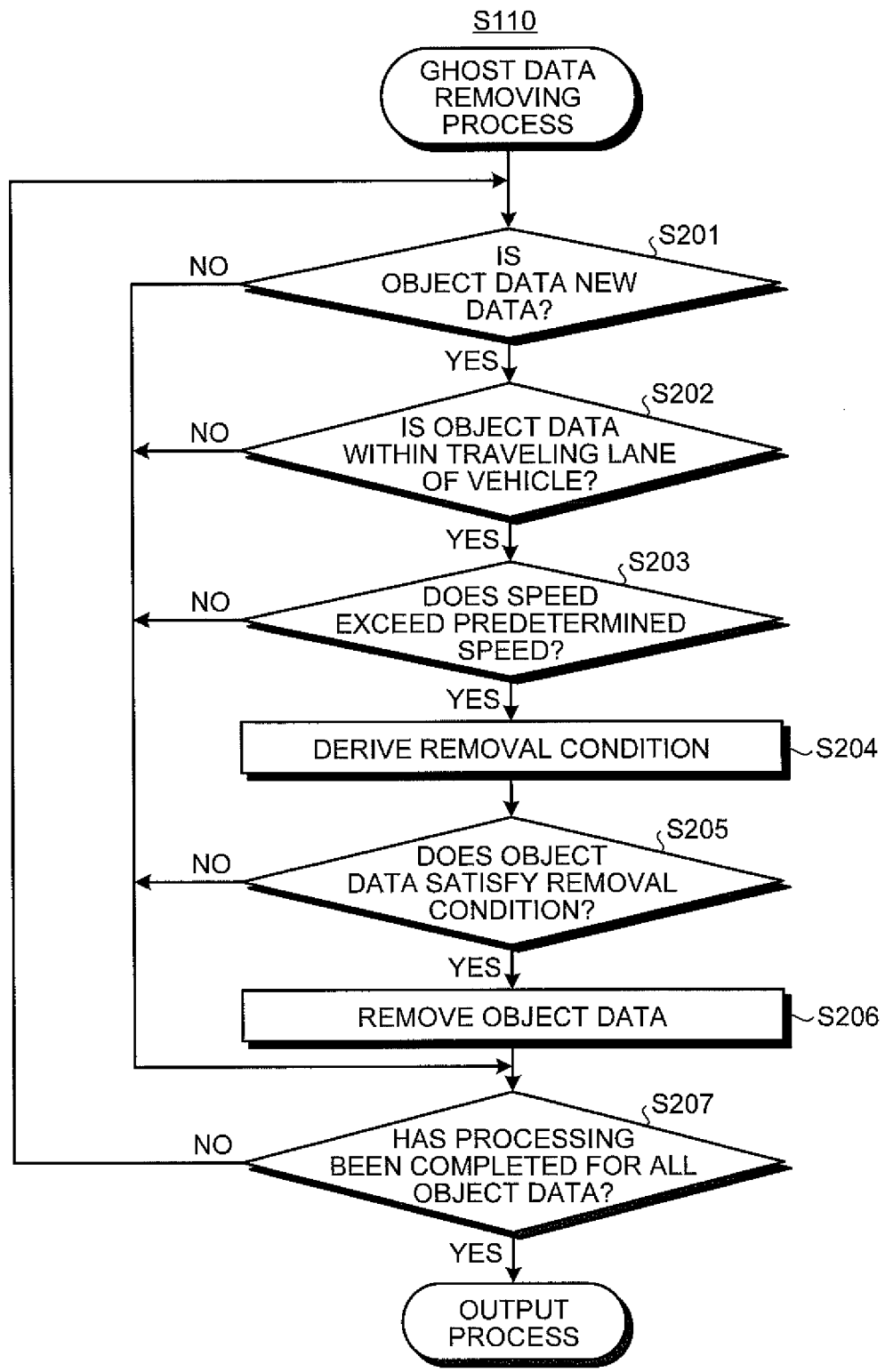
FIG. 11 is a flowchart illustrating a ghost data removing process according to an embodiment.

FIG. 11 is a flowchart illustrating a ghost data removing process (hereinafter, simply referred to as a "removing process") according to an embodiment. This process is a process for detecting object data satisfying each removal condition from among a plurality of pieces of object data as ghost data corresponding to a microscopic object and removing the detected ghost data from the output target for the vehicle control device 2.

The process of Step S201 is a process performed based on one removal condition out of a plurality of removal conditions, and the signal processing unit 17 determines whether or not object data is newly detected object data having no time continuity in a plurality of scans. In other words, the signal processing unit 17 determines whether object data is the past correspondence data or new data. Then, in a case where the object data is the new data (Yes in Step S201), the process proceeds to the process of Step S202. On the other hand, in a case where the object data is the past correspondence data (No in Step S201), the removing process ends, and the process proceeds to the process of Step S207 to be described below. From this, object data detected to have time continuity in a plurality of scans is output to the vehicle control device 2 as object data needed to be a control target, and it can be prevented to output object data that does not need to be a control target to the vehicle control device 2.

Here, in the case of new data, the object data is data having a possibility of being ghost data, and the removing process is continued, and, in the case of past correspondence data, the object data is data having no possibility of being ghost data, and the removing process ends, the reason for which is as follows. Object data (new data) that is detected first in a plurality of scans has a possibility of being ghost data, and object data (past correspondence data) having time continuity in a plurality of scans has a high possibility of being not a microscopic object such as snow or rain but object data corresponding to an object such as another vehicle to be a control target for the vehicle control device 2, whereby such a process is performed.

Next, Step S202 is a process performed based on one removal condition out of a plurality of removal conditions, and the signal processing unit 17 determines whether or not object data is present within a lane in which the vehicle travels. In other words, the signal processing unit 17 determines whether or not object data is present at a position passing the position (for example, a position in a case where the vehicle travels at the approximate center of the traveling lane) of the vehicle over about 1.8 m in the horizontal direction based on information of the horizontal position corresponding to angle information of the object data.

Then, in a case where the object data is present within the traveling lane of the vehicle (a position below about 1.8 m) (Yes in Step S202), the process proceeds to the process of Step S203. On the other hand, in a case where the object data is not present within the traveling lane of the vehicle, in other words, in a case where the object data is present at a position (for example, a position over about 1.8 m) such as a lane (hereinafter, referred to as an "adjacent lane") adjacent to the traveling lane of the vehicle (No in Step S202), the removing process ends, and the process proceeds to the process of Step S207. From this, object data located at a position outside the traveling lane of the vehicle within the scanning range is output to the vehicle control device 2 as object data that is needed to be a control target, and it can be prevented to output object data that does not need to be a control target to the vehicle control device 2.

Here, the object data present within the traveling lane of the vehicle is regarded as data having a possibility of being ghost data, and the removal process is continued, and the object data present in the adjacent lane or the like is regarded as data having no possibility of being ghost data, and the removing process ends, the reason for which is as follows. In a case where object data having a relative speed corresponding to the speed of the vehicle is present at a short distance (for example, 6.64 m toward the front side of the vehicle) from the vehicle within the traveling lane of the vehicle, there is a high possibility that the object data is a microscopic object such as snow or rain. For that reason, such object data is regarded to have a possibility of being ghost data, and the removing process is continued.

On the other hand, in a case where another vehicle traveling in an adjacent lane is present, a distance between the vehicle and the other vehicle is a short distance, and there is a case where the relative speed is a relative speed corresponding to the speed of the vehicle. In such a case, there is a high possibility that the object data is object data corresponding to the other vehicle. For that reason, such object data is regarded to have no possibility of being ghost data, the removing process ends, and the object data is set as an output target for the vehicle control device 2.

Next, Step S203 is a process performed based on one removal condition out of a plurality of removal conditions, and the signal processing unit 17 determines whether or not the speed of the vehicle exceeds a predetermined speed. For example, it is determined whether or not the speed of the vehicle exceeds 30 km/h. Then, in a case where the speed of the vehicle exceeds 30 km/h (Yes in Step S203), the process proceeds to the process of Step S204. On the other hand, in a case where the speed of the vehicle is below 30 km/h (No in Step S203), the removing process ends, and the process proceeds to the process of Step S207. From this, object data detected in a case where the vehicle travels at a relatively low speed is output to the vehicle control device 2 as object data needed to be a control target, and it can be prevented to output object data that does not need to be a control target to the vehicle control device 2.

Here, in a case where the speed of the vehicle exceeds a predetermined speed, the object data is regarded as data having a possibility of being ghost data, and the removing process is continued, and, in a case where the speed of the vehicle is below the predetermined speed, the object data is regarded to have no possibility of being ghost data and is not set as a target for the removing process, the reason for which is as follows. The case where the speed of the vehicle exceeds a predetermined speed (for example, 30 km/h) is a case where the vehicle travels at a relatively high speed (for example, 60 km/h). In such a case, object data detected at a short distance (for example, 6.64 m toward the front side of the vehicle) from the vehicle has a high possibility of being a microscopic object such as snow or rain. For that reason, such object data is set as a target for the removing process.

In addition, in a case where the speed of the vehicle is below a predetermined speed, there is a time when object data is detected at a short distance from the vehicle. The case where the speed of the vehicle is below a predetermined speed as above is a case where the vehicle travels at a relatively low speed (for example, 10 km/h). In such a case, the object data detected at a short distance (for example, 6.64 m toward the front side of the vehicle) from the vehicle has a high possibility of being object data corresponding to the other vehicle (for example, a vehicle stopping and waiting for the light) present on the front side of the vehicle. For that reason, such object data is regarded to have no possibility of being ghost data, the removing process ends, and the object data is an output target for the vehicle control device 2.

Next, Step S204 is a process of deriving one removal condition out of a plurality of removal conditions, the signal processing unit 17 derives a removal condition based on a reference distance Rs (for example, 6.64 m illustrated in FIG. 12) and a reference relative speed Vs (for example, 16.6 m/s illustrated in FIG. 13) of object data with respect to the speed (for example, 60 km/h) of the vehicle, and the process proceeds to the process of Step S205. More specifically, the signal processing unit 17 derives a reference distance Rs that is a distance of object data corresponding to ghost data out of a plurality of pieces of object data by using Equation (3). In addition, the signal processing unit 17 derives a reference relative speed Vs that is a relative speed of the object data corresponding to ghost data out of the plurality of pieces of object data by using Equation (4).

$$Rs \text{ [m]}=\text{MAX}(0.66 \text{ [m]}, 0.40 \times \text{speed of vehicle 1 [m]}) \quad (3)$$

$$Vs \text{ [m/s]}=\text{MAX}(-(\text{speed of vehicle 1 [m/s]}), -1.65 \text{ [m/s]}) \quad (4)$$

In addition, the signal processing unit 17 derives a specific distance range having a predetermined range that includes the reference distance Rs derived using Equation (3) by using Equation (5). More specifically, the signal processing unit 17 derives a predetermined distance range (3.89 m to 9.39 m) that is a distance range between a subtracted reference distance (6.64−2.75=3.89 m) acquired by subtracting a first standard deviation (for example, 2.75 m) from the reference distance Rs and an added reference distance (6.64+2.75=9.39) acquired by adding the first standard deviation to the reference distance Rs.

$$Rs \text{ [m]} - \text{standard deviation} \leq \text{specific distance range [m]} \leq Rs \text{ [m]} + \text{standard deviation} \quad (5)$$

In addition, the signal processing unit 17 derives a specific relative speed range having a predetermined range including the reference relative speed Vs (for example, 16.6 m/s) derived by Equation (4) by using Equation (6). More specifically, the signal processing unit 17 derives a specific relative speed range (−13.24 m/s to −19.96 m/s) that is a relative speed between a subtracted reference relative speed (−16.6−3.36=−19.96 m/s) acquired by subtracting a second standard deviation (for example, 3.36 m/s) from the reference relative speed Vs and an added reference relative speed (−16.6+3.36=−13.24 m/s) acquired by adding the first standard deviation to the reference relative speed Vs.

$$Vs \text{ [m/s]} - \text{standard deviation} \leq \text{specific relative speed range} \leq Vs \text{ [m/s]} + \text{standard deviation} \quad (6)$$

The first standard deviation and the second standard deviation described above are derived based on experimental values and are used for extracting ghost data from object data without omission by arranging predetermined ranges for the reference distance Rs and the reference relative speed Vs.

In Step S205, in a case where the object data satisfies the removal condition of Step S204 (Yes in Step S205), in other words, in a case where the distance and the relative speed of the object data are included in both the specific distance range and the specific relative speed range, the signal processing unit 17 proceeds to the process of Step S206.

On the other hand, in a case where the object data does not satisfy the removal condition of Step S204 (No in Step S205), in other words, in a case where the distance and the relative speed of the object data are not included in both the specific distance data and the specific relative speed range, the signal processing unit 17 proceeds to the process of Step S207.

In Step S206, the signal processing unit 17 regards the object data as ghost data corresponding to a microscopic object and removes the object data, and the process proceeds to the process of Step S207.

In Step S207, the signal processing unit 17 determines whether or not the removing process has been completed for all the detected object data. Then, in a case where the removing process has been completed for all the object data (Yes in Step S207), the process proceeds to the output process of Step S111. On the other hand, in a case where the removing process has not been completed for all the object data (No in Step S207), the process is returned to the process of Step S201, and the signal processing unit 17 continues to perform the removing process.

In the above-described flowchart, although the process has been described in which object data satisfying all the four removal conditions of Steps S201 to S205 is removed as ghost data, a process of removing the object data satisfying at least the removal condition of Step S205 as ghost data may be performed.

In other words, the signal processing unit 17 may remove ghost data that is object data satisfying the removal condition, which is a condition used for determining whether or not the object data is excluded from the output target for the vehicle control device 2 and includes at least a distance and a relative speed of the object data with respect to the speed of the vehicle as conditions, from the output target for the vehicle control device 2. From this, object data that does not need to be a control target for the vehicle control device 2 can be prevented from being output to the vehicle control device 2 from the radar device 1, and it can be prevented that the vehicle control device 2 performs unnecessary control for the vehicle control device 2.

4. Data of Reference Distance and Reference Relative Speed

Figure 12:
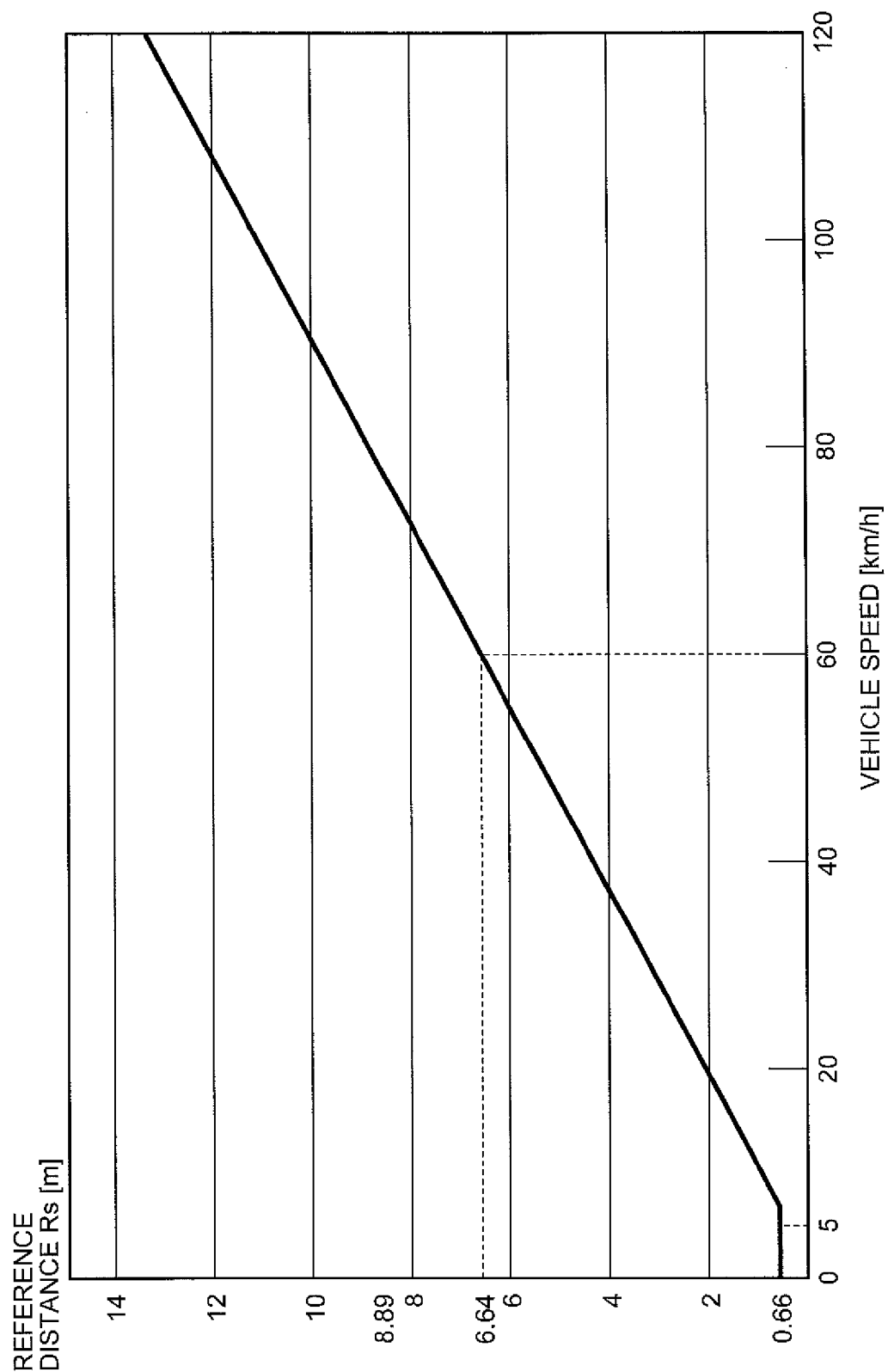
FIG. 12 is a diagram illustrating a graph of a reference distance with respect to the speed of a vehicle according to an embodiment.

FIG. 12 is a diagram illustrating a graph of the reference distance Rs that is a distance of ghost data corresponding to a microscopic object with respect to the speed of the vehicle according to an embodiment. In this graph, the horizontal axis represents the speed of the vehicle [km/h], and the vertical axis represents the distance [m]. This graph represents the reference distance Rs according to the speed of the vehicle that is derived by Equation (3) described above.

Values represented in the graph are as follows. For example, in a case where the speed of the vehicle is 5 km/h, the reference distance Rs is 0.66 m. In addition, in a case where the speed of the vehicle is 60 km/h, the reference distance Rs is 6.64 m. The graph of the reference distance Rs illustrated in FIG. 12 is configured based on theoretical values, and, in a case where the speed of the vehicle is relatively low (0 to 10 km/h), an approximately constant value is acquired. When the case where the speed of the vehicle is relatively low is excluded, a graph of a linear function is formed which represents a proportional trend in which the value increases in accordance with an increase in the speed of the vehicle.

Figure 13:
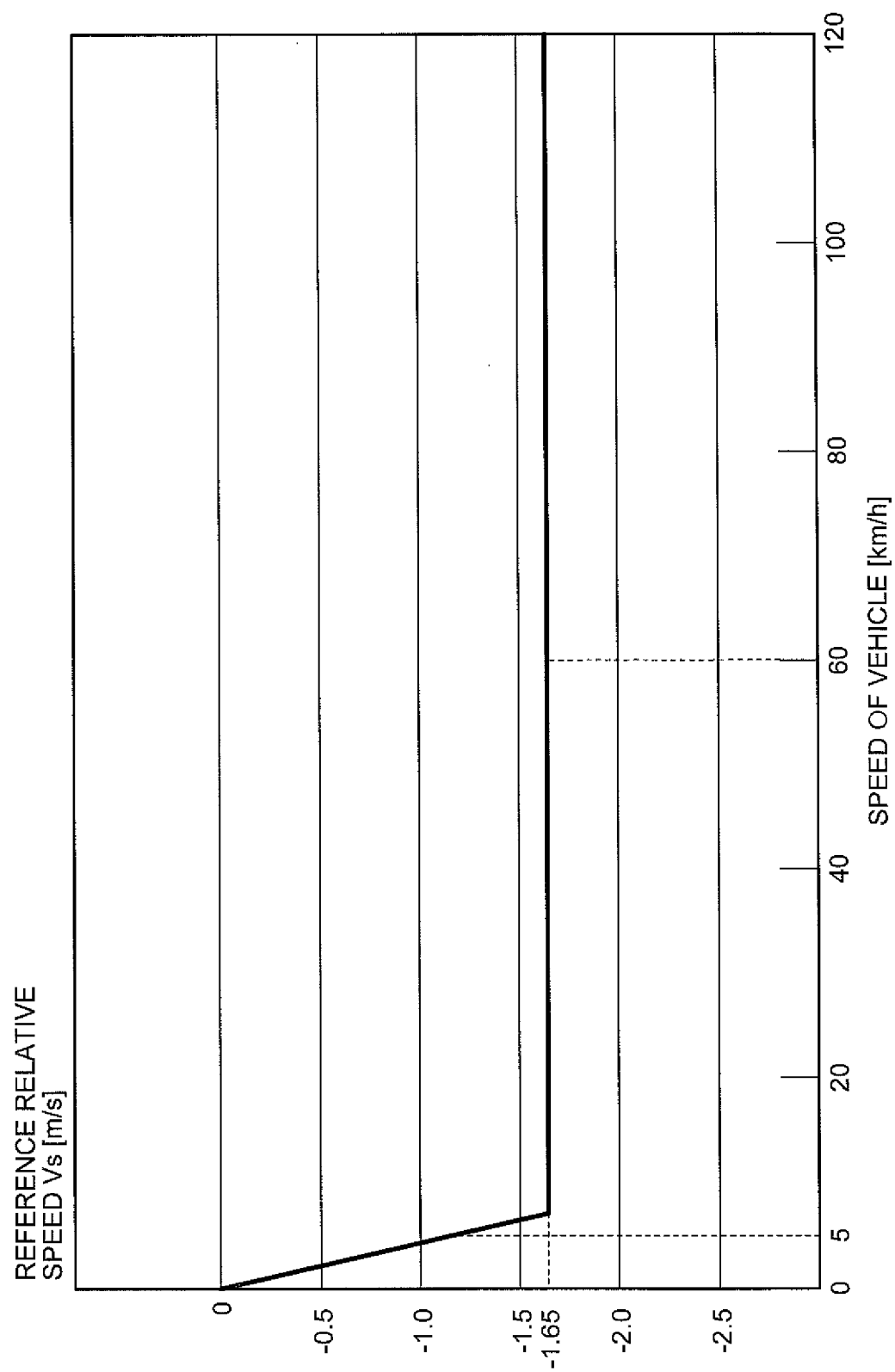
FIG. 13 is a diagram illustrating a graph of a reference relative speed with respect to the speed of a vehicle according to an embodiment.

FIG. 13 is a diagram illustrating a graph of the reference relative speed Vs, which is a relative speed of ghost data corresponding to a microscopic object, with respect to the speed of a vehicle according to an embodiment. In this graph, the horizontal axis represents the speed of the vehicle [km/h], and the vertical axis represents the relative speed [m/s]. This graph represents the reference relative speed Vs in accordance with the speed of the vehicle derived using Equation (4) described above.

Values represented in the graph are as follows. For example, in a case where the speed of the vehicle is 5 km/h, the reference relative speed is −1.0 m/s, and, in a case where the speed of the vehicle is 60 km/h, the reference relative speed is −1.65 m/s. The graph of the reference relative speed illustrated in FIG. 13 is configured based on theoretical values, and, in a case where the speed of the vehicle is relatively low (0 to 10 km/h), a graph of a linear function representing an inverse proportional trend is formed in which the reference relative speed decreases in accordance with an increase in the speed of the vehicle. When the case where the speed of the vehicle is relatively low is excluded, a graph is formed which represents an approximately constant value of the reference relative speed Vs in accordance with an increase in the speed of the vehicle.

5. Result of Applying Removing Process

Figure 14:
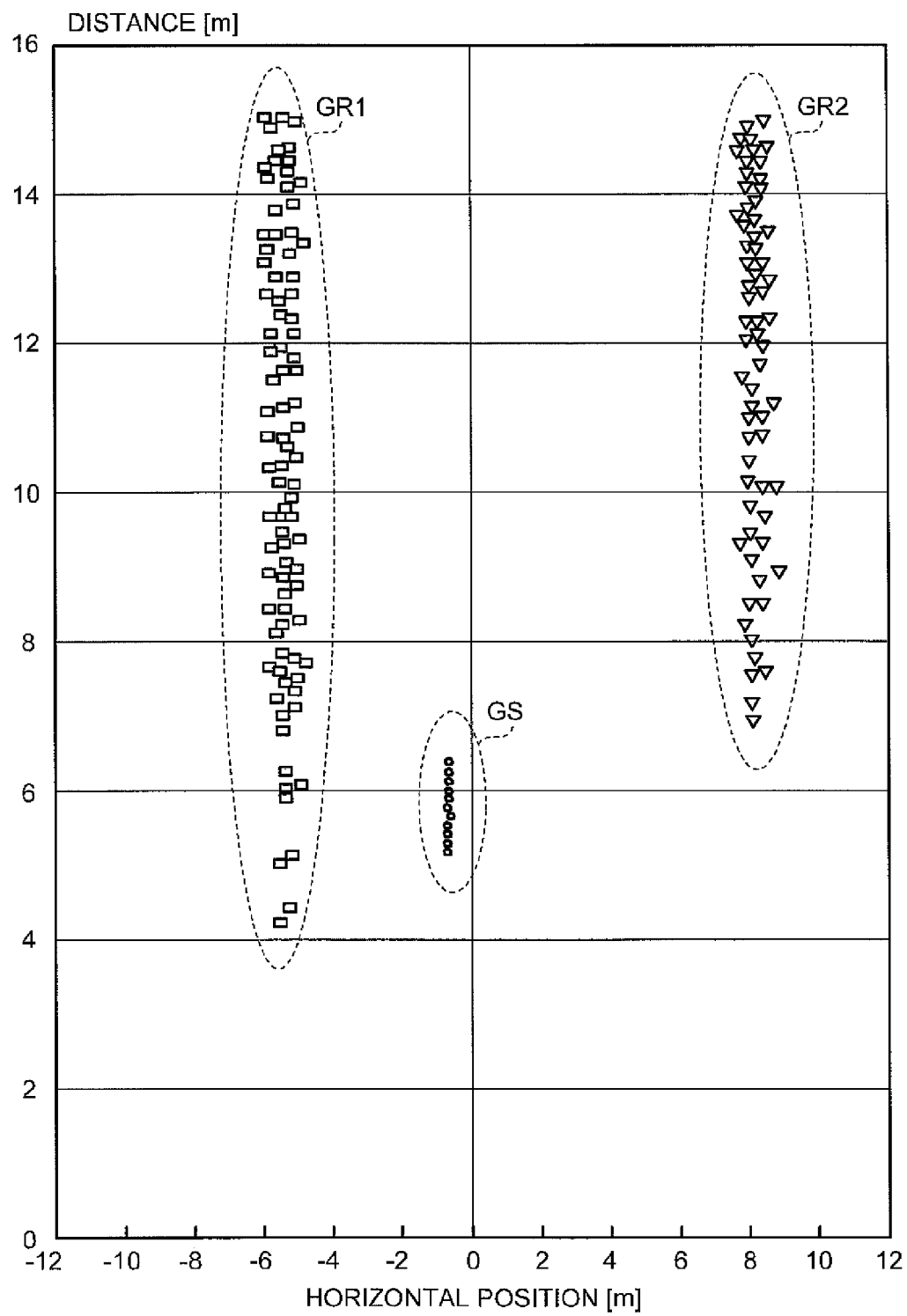
FIG. 14 is a diagram illustrating the detection status of object data before the ghost data removing process according to an embodiment is performed.
Figure 15:
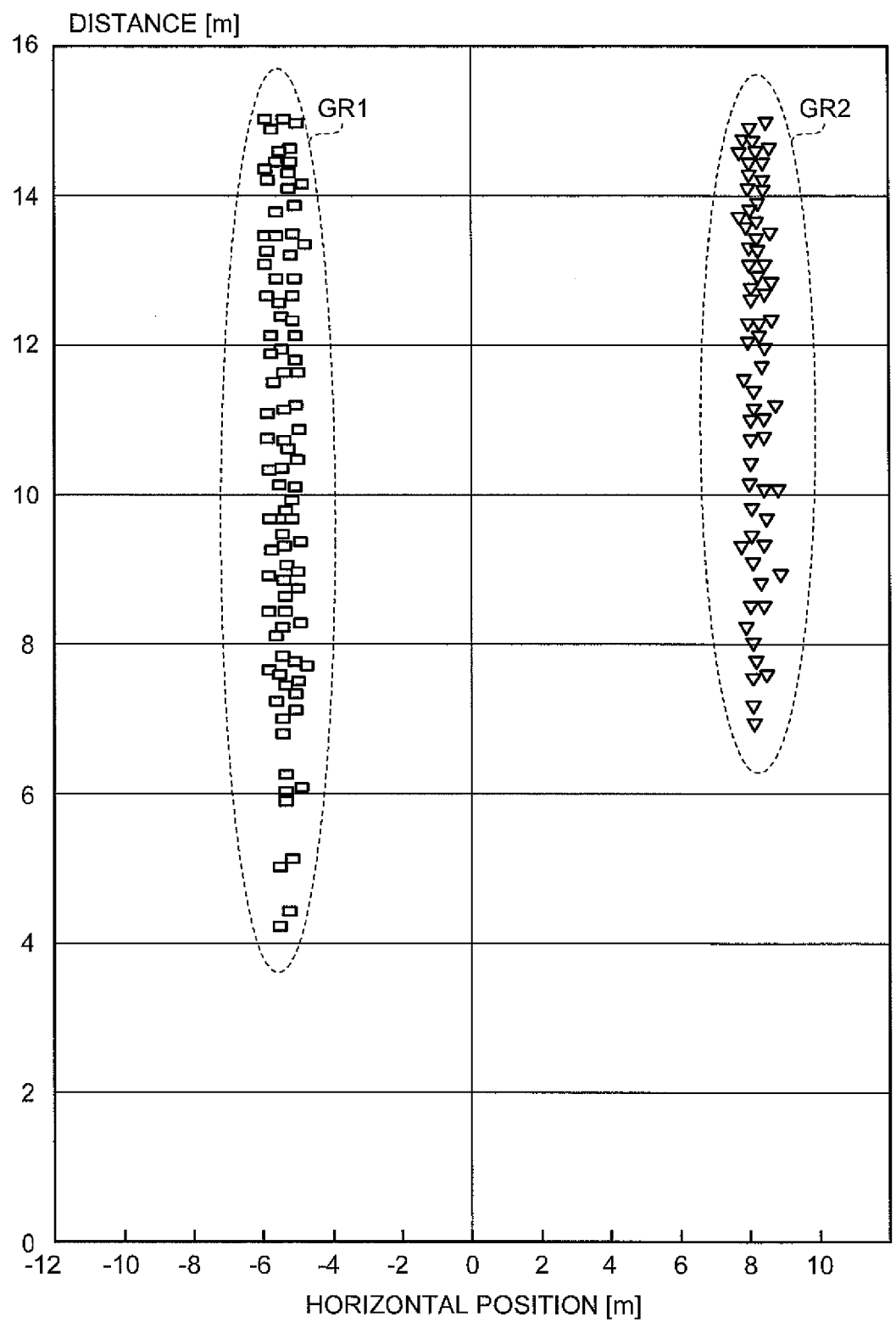
FIG. 15 is a diagram illustrating the detection status of object data after the ghost data removing process according to an embodiment is performed.

FIG. 14 is a diagram illustrating the detection status of object data before the ghost data removing process according to an embodiment is performed. FIG. 15 is a diagram illustrating the detection status of object data after the ghost data removing process according to an embodiment is performed. In FIGS. 14 and 15, the vertical axis represents the distance [m], the horizontal axis represents the horizontal position [m], and the position of the vehicle is assumed to be a position of a distance of 0 m and a vertical position of 0 m. FIGS. 14 and 15 illustrate results acquired when the detection of object data using the radar device 1 is performed, for example, continuously for 10 seconds.

An object data group GR1 illustrated in FIG. 14 represents detection of a guard rail that is a stationary object present on the left side of the traveling lane of the vehicle. By plotting results of detection of object data corresponding to the guard rail for about 10 seconds, a plurality of pieces of object data are displayed at distances of 4 m to 15 m and a horizontal position of about −6 m. In addition, an object data group GR2 represents detection of a guard rail that is a stationary object present on the right side of the traveling lane of the vehicle. By plotting results of detection of object data corresponding to the guard rail for about 10 seconds, a plurality of pieces of object data are displayed at distances of 7 m to 15 m and a horizontal position of about 8 m.

Furthermore, an object data group GS represents detection of ghost data corresponding to a microscopic object that is present on the front side of traveling of the vehicle. By plotting results of detection of the ghost data corresponding to a microscopic object for about 10 seconds, a plurality of pieces of object data are displayed at distances of 5 m to 7 m and a horizontal position of about 0 m. In other words, a plurality of pieces of object data are detected in front of the vehicle at a short distance. In a case where such object data is output to the vehicle control device 2, there is a time when the vehicle control device 2 performs control of the PCS that is originally unnecessary.

As illustrated in FIG. 15, as a result of the ghost data removing process, which is a process described with reference to FIG. 11, performed by the signal processing unit 17, the object data group GS is removed. From this, the vehicle control device 2 does not perform unnecessary control, whereby the safety of a user using the vehicle is secured.

MODIFIED EXAMPLE

As above, while the embodiment of the present invention has been described, the invention is not limited to the above-described embodiment, and various modifications may be made therein. Hereinafter, such modified examples will be described. In addition, all the forms including the forms described in the above-described embodiment and forms to be described as below may be appropriately combined.

In the above-described embodiment, the process of Steps S204 to S206 may be the process that is performed before Step S201. From this, even in a case where object data that is detected continuously in time in a plurality of scans and is needed to be output to the vehicle control device 2 satisfies the condition for being a target for the removing process as ghost data corresponding to a microscopic object in one scan out of the plurality of scans, the object data is output to the vehicle control device 2 without being a target for the removing process. In other words, object data corresponding to an object needed to be output to the vehicle control device 2 is not set as a target for the removing process, and appropriate vehicle control can be performed.

In addition, in the above-described embodiment, although the radar device 1 has been described to acquire the information of the speed of the vehicle through the vehicle control device 2, the radar device 1 may acquire the information of the speed of the vehicle not through the vehicle control device 2 but directly from the vehicle speed sensor 40.

Furthermore, in the above-described embodiments, the angle deriving process of the radar device 1 has been described as a process according to the algorithm of the ESPRIT. However, the angle deriving may be performed by using the other algorithms as follows. More specifically, any one algorithm of DBF (Digital Beam Forming), a PRISM (Propagator method based on an Improved Spatial-smoothing Matrix), MUSIC (Multiple Signal Classification) and the like may be used.

In addition, in the above-described embodiments, the radar device 1 may be used for various uses other than for being mounted in a vehicle (for example, at least any one of monitoring an airplane during a flight or monitoring a ship during sailing).

Furthermore, in the above-described embodiments, although it has been described that there are two transmission antennas and four reception antennas, the number of antennas may be other than that, and, for example, it may be configured such that there are one transmission antenna and five reception antennas.

In addition, in the above-described embodiments, in the radar device 1, although the reception antenna 14 and the transmission antenna 13 are independently arranged, the reception antenna may also serve as the transmission antenna. In such a case, immediately after transmitting a transmission wave, each antenna is changed to be in a reception state and can receive a reflected wave that is acquired by reflecting the transmission wave on an object.

Furthermore, in the above-described embodiment, the vehicle control device 2 that outputs object data may also include a system that does not control a vehicle, for example, a system that controls informing a user using the vehicle of a warning using the alarm 52 based on the object data in addition to the system that controls a vehicle based on the object data such as the ACC or the PCS described above. For that reason, the vehicle control device 2 may include a device that controls the behavior of the system disposed in the vehicle in addition to the device that controls the behavior of the vehicle.

As described above, the radar device according to an embodiment includes a transmission unit, a reception unit, and a processing unit. The transmission unit emits a transmission wave relating to a frequency-modulated transmission signal. The reception unit receives a reflected wave acquired by reflecting the transmission wave on an object as a reception signal. The processing unit detects object data corresponding to the object from the reception signal, outputs the object data to the vehicle control device that controls the vehicle, and removes object data satisfying the removal condition that is a condition used for determining whether or not object data is to be removed from an output target for the vehicle control device and includes at least the distance and the relative speed of the object data with respect to the speed of the vehicle as conditions from output targets for the vehicle control device.

In addition, the object data satisfying the removal condition according to the embodiment is object data that corresponds to at least one of rain and snow.

Furthermore, the removal condition according to an embodiment further includes a condition of whether or not the object data is the object data, which is newly detected, not having time continuity in a plurality of scans.

In addition, the removal condition according to an embodiment further includes a condition of whether or not the object data is present within a lane in which the vehicle travels.

Furthermore, the removal condition according to an embodiment further includes a condition of whether or not the speed of the vehicle exceeds a predetermined speed.

In addition, a method of processing a signal according to an embodiment includes: emitting a transmission wave relating to a frequency-modulated transmission signal; receiving a reflected wave acquired by reflecting the transmission wave on an object as a reception signal; and detecting object data corresponding to the object from the reception signal, removing the object data satisfying a removal condition that is a condition used for determining whether or not the object data is to be removed from an output target for a vehicle control device controlling the vehicle and includes at least a distance and a relative speed of the object data with respect to a speed of the vehicle as conditions from the output target for the vehicle control device, and outputting the object data to the vehicle control device.

According to the radar device and the method of processing a signal of an embodiment, object data having no need to be a control target of the vehicle control device is prevented from being output from the radar device to the vehicle control device, and unnecessary control of the vehicle control device for the vehicle can be prevented.

In addition, according to the radar device of an embodiment, object data corresponding to a microscopic object such as rain or snow that does not need to be a control target for the vehicle control device can be prevented from being output to the vehicle control device.

Furthermore, according to the radar device of an embodiment, object data detected to have time continuity in a plurality of scans is output to the vehicle control device as object data needed to be a control target, and it can be prevented to output object data that does not need to be a control target to the vehicle control device.

In addition, according to the radar device of an embodiment, object data located at a position outside the traveling lane of the vehicle within the scanning range is output to the vehicle control device as object data that is needed to be a control target, and it can be prevented to output object data that does not need to be a control target to the vehicle control device.

Furthermore, according to the radar device of an embodiment, object data detected in a case where the vehicle travels at a relatively low speed is output to the vehicle control device as object data needed to be a control target, and it can be prevented to output object data that does not need to be a control target to the vehicle control device.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A radar device comprising:
a transmission unit that emits a transmission wave relating to a frequency-modulated transmission signal;
a reception unit that receives a reflected wave acquired by reflecting the transmission wave on an object as a reception signal; and
a processing unit that detects object data corresponding to the object from the reception signal, outputs the object data that is not removed from an output target for a vehicle control device to the vehicle control device that controls the vehicle, and removes the object data satisfying a removal condition that is a condition used for determining whether or not the object data is to be removed from the output target for the vehicle control device and includes at least a distance and a relative speed of the object data with respect to a speed of the vehicle as conditions from the output target for the vehicle control device, wherein
the processing unit derives an angle of the object based on a peak signal whose signal level exceeds a predetermined threshold in each one of an UP zone, in which a frequency of the transmission signal increases, and a Down zone, in which the frequency of the transmission signal decreases, and
the processing unit, (i) in a case where the object data is present within a traveling lane of the vehicle, determines whether or not the speed of the vehicle exceeds a predetermined speed, as the determination result, (ii) in a case where the speed of the vehicle exceeds the predetermined speed, derives the removal condition based on a reference distance that is a distance of the object data corresponding to ghost data out of a plurality of pieces of object data and a reference relative speed that is a relative speed of the object data corresponding to ghost data out of a plurality of pieces of object data with respect to the speed of the vehicle, as the determination result, (iii) in a case where the speed of the vehicle is below the predetermined speed, ends the removing process, and (iv) in a case where the object data is not present within the traveling lane of the vehicle, ends the removing process.

2. The radar device according to claim 1, wherein the object data satisfying the removal condition is object data corresponding to at least one of rain and snow.

3. The radar device according to claim 1, wherein the removal condition further includes a condition of whether or not the object data is object data, which is newly detected, not having time continuity in a plurality of scans.

4. The radar device according to claim 2, wherein the removal condition further includes a condition of whether or not the object data is object data, which is newly detected, not having time continuity in a plurality of scans.

5. The radar device according to claim 1, wherein the removal condition further includes a condition of whether or not the object data is present within a lane in which the vehicle travels.

6. The radar device according to claim 2, wherein the removal condition further includes a condition of whether or not the object data is present within a lane in which the vehicle travels.

7. The radar device according to claim 3, wherein the removal condition further includes a condition of whether or not the object data is present within a lane in which the vehicle travels.

8. The radar device according to claim 1, wherein the removal condition further includes a condition of whether or not the speed of the vehicle exceeds a predetermined speed.

9. The radar device according to claim 2, wherein the removal condition further includes a condition of whether or not the speed of the vehicle exceeds a predetermined speed.

10. The radar device according to claim 3, wherein the removal condition further includes a condition of whether or not the speed of the vehicle exceeds a predetermined speed.

11. The radar device according to claim 4, wherein the removal condition further includes a condition of whether or not the speed of the vehicle exceeds a predetermined speed.

12. The radar device according to claim 5, wherein the removal condition further includes a condition of whether or not the speed of the vehicle exceeds a predetermined speed.

13. The radar device according to claim 6, wherein the removal condition further includes a condition of whether or not the speed of the vehicle exceeds a predetermined speed.

14. The radar device according to claim 7, wherein the removal condition further includes a condition of whether or not the speed of the vehicle exceeds a predetermined speed.

15. A method of processing a signal comprising:
emitting a transmission wave relating to a frequency-modulated transmission signal;
receiving a reflected wave acquired by reflecting the transmission wave on an object as a reception signal; and
detecting object data corresponding to the object from the reception signal, by a processor, removing the object data satisfying a removal condition that is a condition used for determining whether or not the object data is to be removed from an output target for a vehicle control device controlling the vehicle and includes at least a distance and a relative speed of the object data with respect to a speed of the vehicle as conditions from the output target for the vehicle control device, by the processor, and outputting the object data that is not removed from the output target for the vehicle control device to the vehicle control device, by the processor, wherein the removing includes deriving an angle of the object based on a peak signal whose signal level exceeds a predetermined threshold in each one of an UP zone, in which a frequency of the transmission signal increases, and a DOWN zone, in which the frequency of the transmission signal decreases, and the removing includes, (i) in a case where the object data is present within a traveling lane of the vehicle, determining whether or not the speed of the vehicle exceeds a predetermined speed, as the determination result, (ii) in a case where the speed of the vehicle exceeds the predetermined speed, deriving the removal condition based on a reference distance that is a distance of the object data corresponding to ghost data out of a plurality of pieces of object data and a reference relative speed that is a relative speed of the object data corresponding to ghost data out of a plurality of pieces of object data with respect to the speed of the vehicle, as the determination result, (iii) in a case where the speed of the vehicle is below the predetermined speed, ending the removing process, and (iv) in a case where the object data is not present within the traveling lane of the vehicle, ending the removing process.

16. The method of processing a signal according to claim 15, wherein the object data satisfying the removal condition is object data corresponding to at least one of rain and snow.

17. The method of processing a signal according to claim 15, wherein the removal condition further includes a condition of whether or not the object data is object data, which is newly detected by the processor, not having time continuity in a plurality of scans.

18. The method of processing a signal according to claim 15, wherein the removal condition further includes a condition of whether or not the object data is present within a lane in which the vehicle travels.

19. The method of processing a signal according to claim 15, wherein the removal condition further includes a condition of whether or not the speed of the vehicle exceeds a predetermined speed.

* * * * *